United States Patent
Hung et al.

(10) Patent No.: US 12,422,726 B2
(45) Date of Patent: Sep. 23, 2025

(54) METHOD OF MAKING THIN FILM LITHIUM NIOBATE ELECTRO-OPTICAL MODULATORS

(71) Applicant: OPTILAB, LLC, Phoenix, AZ (US)

(72) Inventors: Henry H. Hung, Paradise Valley, AZ (US); Leijun Yin, Tempe, AZ (US); Xiaoyan Ying, Tempe, AZ (US); Ke Huang, Phoenix, AZ (US)

(73) Assignee: Optilab, LLC, Phoenix, AZ (US)

( * ) Notice: Subject to any disclaimer, the term of this patent is extended or adjusted under 35 U.S.C. 154(b) by 344 days.

(21) Appl. No.: 18/317,534

(22) Filed: May 15, 2023

(65) Prior Publication Data
US 2023/0384646 A1    Nov. 30, 2023

Related U.S. Application Data

(60) Provisional application No. 63/345,831, filed on May 25, 2022.

(51) Int. Cl.
*G02F 1/035*    (2006.01)
*G02B 6/13*    (2006.01)
(Continued)

(52) U.S. Cl.
CPC .............. *G02F 1/2255* (2013.01); *G02B 6/13* (2013.01); *G02F 1/0356* (2013.01);
(Continued)

(58) Field of Classification Search
CPC ...... G02F 1/035; G02F 1/0353; G02F 1/0356; G02F 1/225; G02F 2201/063; G02F 2202/20; G02B 6/13; G02B 2006/1204
(Continued)

(56) References Cited

U.S. PATENT DOCUMENTS

| 7,729,580 B2 * | 6/2010 | Tanaka | G02B 6/126 385/132 |
| 10,663,661 B1 * | 5/2020 | Rabiei | G02B 6/122 |

(Continued)

FOREIGN PATENT DOCUMENTS

| CN | 111740003 A | * 10/2020 | ............. H01L 41/08 |
| CN | 111755591 A | * 10/2020 | ........... H01L 41/083 |

(Continued)

OTHER PUBLICATIONS

Li et al. "Broadband sum-frequency generation using d33 in periodically poled LiNbO3 thin film in the telecommunications band." Optics Letters, vol. 42, No. 5 pp. 939-942 (Feb. 24, 2017).
(Continued)

*Primary Examiner* — Robert Tavlykaev
(74) *Attorney, Agent, or Firm* — George Fountain; LOZA & LOZA, LLP

(57) ABSTRACT

A method of forming an electro-optical modulator including forming a lithium-niobate (LN) wafer including an optical waveguide situated within and proximate a first side of the LN wafer; bonding the LN wafer to a substrate such that the first side of the LN wafer faces the substrate; thinning the LN wafer; and forming coplanar transmission lines over and/or on a second side of the LN wafer, wherein the coplanar transmission lines extend parallel with and are laterally on either side of the optical waveguide.

25 Claims, 21 Drawing Sheets

(51) Int. Cl.
  *G02F 1/225* (2006.01)
  *G02B 6/12* (2006.01)
(52) U.S. Cl.
  CPC .............. *G02B 2006/12142* (2013.01); *G02F 2201/063* (2013.01); *G02F 2202/20* (2013.01)
(58) Field of Classification Search
  USPC .................................. 385/1–3, 14, 130–132
  See application file for complete search history.

(56) References Cited

U.S. PATENT DOCUMENTS

| | | | |
|---|---|---|---|
| 11,448,907 B2 * | 9/2022 | Tai .......................... | G02F 1/035 |
| 2014/0210317 A1 * | 7/2014 | Tai ......................... | H10N 30/88 |
| | | | 310/348 |

FOREIGN PATENT DOCUMENTS

| | | | | |
|---|---|---|---|---|
| CN | 113540063 A | * | 10/2021 | ............. H01L 25/16 |
| JP | 2005-221894 | * | 8/2005 | ............. G02F 1/377 |
| WO | WO 2023/167633 A1 | * | 9/2020 | ............. G02F 1/035 |

OTHER PUBLICATIONS

Mangal et al. "Monolithic integration of microlenses on the backside of a silicon photonics chip for expanded beam coupling." Optics Express 7601, vol. 29, No. 5 (Mar. 1, 2021).

Mangal et al. "Expanded-beam backside coupling interface for alignment—tolerant packaging of silicon photonics." IEEE Journal of Selected Topics in Quantum Electronics, vol. 26, No. 2, pp. 1-7 (Mar.-Apr. 2020).

Mercante et al. "Thin LiNbO3 on insulator electro-optic modulator." Optics Letters vol. 41, No. 5,, pp. 867-869. (Feb. 17, 2016).

Shams-Ansari et al. "Electrically pumped laser transmitter integrated on thin-film lithium niobate." Optica, vol. 9, pp. 408-411 (Apr. 6, 2022).

Vazimali et al. "Applications of thin-film lithium niobate in nonlinear integrated photonics." Advanced Photonics, vol. 4, No. 3 (May 30, 2022).

Wang et al. "Analysis of Waveguides on Lithium Niobate Thin Films." Crystals, vol. 8, No. 5, pp. 191 (Apr. 27, 2018).

Zhu et al. "Integrated photonics on thin-film lithium niobate." Advances in Optics and Photonics, vol. 13, Issue 2, pp. 242-352 (2021).

* cited by examiner

Nanosecond UV Laser Marking

Marking Depth > 10μm

METHOD OF MAKING THIN FILM LITHIUM NIOBATE ELECTRO-OPTICAL MODULATORS

CROSS-REFERENCE TO RELATED APPLICATION

This application claims the benefit of the filing date of Provisional Application Ser. No. 63/345,831, filed on May 25, 2022, which is incorporated herein by reference.

BACKGROUND

Field

Aspects of the present disclosure relate generally to electro-optical modulators or other optical devices, and in particular, to a method of making a thin-film lithium-niobate (TFLN) electro-optical modulator or other optical devices.

Background

An electro-optical modulator is used to modulate a continuous wave (CW) laser or optical signal with a radio frequency (RF) signal for transmission to a remote device via an optical waveguide or fiber. With regard to such electro-optical modulator, it is generally desirable to reduce the optical and RF signal losses through the device. Additionally, it is also generally desirable to configure the electro-optical modulator to exhibit relatively wide RF bandwidth (e.g., >100 giga Hertz (GHz)). Further, it is generally desirable to configure and operate the electro-optical modulator in a power efficient manner.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

An aspect of the disclosure relates to a method of forming an electro-optical modulator comprising forming a lithium-niobate (LN) wafer including an optical waveguide situated within and proximate a first side of the LN wafer; bonding the LN wafer to a substrate such that the first side of the LN wafer faces the substrate; thinning and polishing the LN wafer; and forming coplanar transmission lines over and/or on a second side of the LN wafer, wherein the coplanar transmission lines extend parallel with and are laterally on either side of the optical waveguide.

To the accomplishment of the foregoing and related ends, the one or more embodiments include the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the description embodiments are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1A:
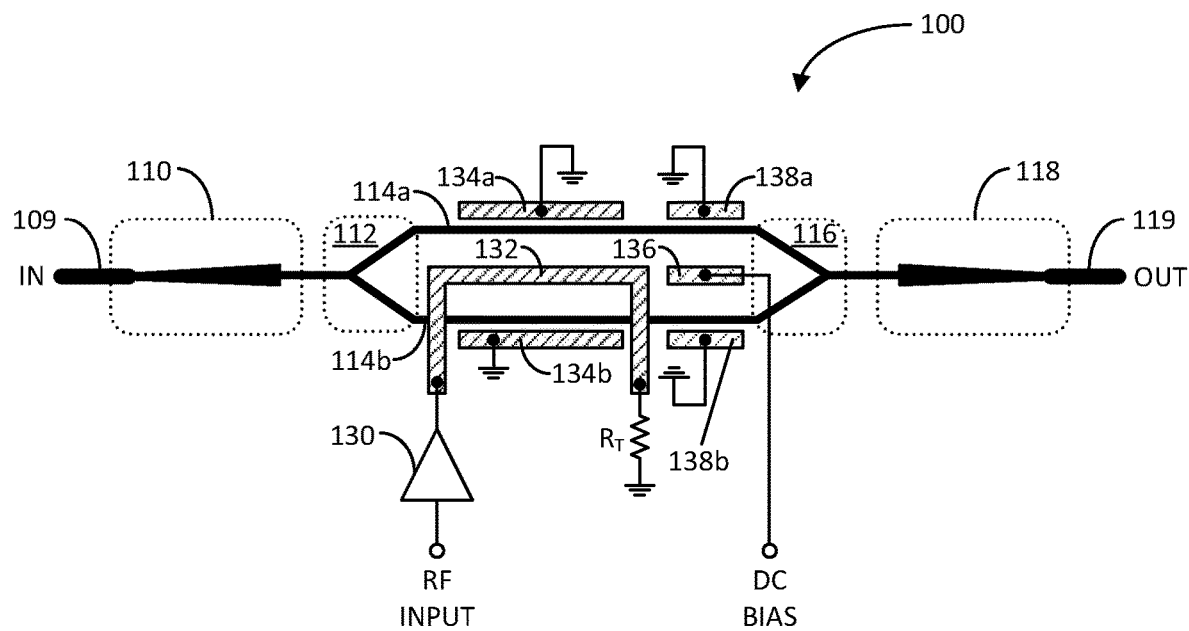
FIG. 1A illustrates a block diagram of an example electro-optical modulator with inverse taper based mode transformer, sub-micron thin-film, small mode-field diameter in accordance with an aspect of the disclosure.

FIG. 1A illustrates a block diagram of an example electro-optical modulator 100 in accordance with an aspect of the disclosure. The example electro-optical modulator 100 may be implemented as a Thin-film Mach Zehnder interferometer (MZI) electro-optical modulator.

In the optical domain, the electro-optical modulator 100 includes an input single-mode optical fiber 109, an input mode field diameter (MFD) converter 110, a Y-splitter 112, a first optical waveguide branch 114a, a second optical waveguide branch 114b, a Y-combiner 116, an optional output MFD converter 118, and an output single-mode optical fiber 119.

The single-mode optical fiber 109 is optically coupled to an input of the input MFD converter 110. The input MFD converter 110 includes an output optically coupled to an input of the Y-splitter 112. The first optical waveguide branch 114a is optically coupled between a first output of the Y-splitter 112 and a first input of the Y-combiner 116. The second optical waveguide branch 114b is optically coupled between a second output of the Y-splitter 112 and a second input of the Y-combiner 116. The Y-combiner 116 includes an output optically coupled to an input of the optional output MFD converter 118 (or directly coupled to an input of the output single-mode optical fiber 119 if the output MFD converter 118 is not present). The optional output MFD converter 118 includes an output optically coupled to the input of the output single-mode optical fiber 119.

In the electrical domain, the electro-optical modulator 100 includes a low noise amplifier (LNA) 130 including an input configured to receive a radio frequency (RF) signal. The LNA 130 includes an output coupled to a first end of a signal transmission line 132 of a coplanar stripline further including first and second grounded transmission lines 134a and 134b. The signal transmission line 132 includes a second end coupled to a termination resistor $R_T$ (e.g., 50 Ohms) coupled to ground. The electro-optical modulator 100 further includes a direct current (DC) bias voltage electrical conductor 136 and associated first and second grounded electrical conductors 138a and 138b. The DC bias voltage conductor 136 is configured to receive a DC bias voltage.

The signal transmission line 132 extends parallel with and is situated laterally between the first and second optical waveguide branches 114a and 114b. The first optical waveguide branch 114a extends parallel with and is laterally situated between the signal transmission line 132 and the first grounded transmission line 134a of the coplanar stripline. Similarly, the second optical waveguide branch 114b extends parallel with and is laterally situated between the signal transmission line 132 and the second grounded transmission line 134b of the coplanar stripline. The DC bias conductor 136 is also situated laterally between the first and second optical waveguide branches 114a and 114b. The first optical waveguide branch 114a is laterally situated between the DC bias conductor 136 and the first grounded conductor 138a. Similarly, the second optical waveguide branch 114b is laterally situated between the DC bias conductor 136 and the second grounded conductor 138b.

In operation, a continuous wave (CW) laser or optical signal from, for example, a laser source (not shown), is provided to the input (IN) of the input single-mode optical fiber 109. The MFD of the optical signal propagating via the input single-mode optical fiber 109 may be about nine (9) micrometers (μm) at a wavelength of about 1550 nanometers (nm). The input MFD converter 110 reduces the MFD of the optical signal received from the input single-mode optical fiber 109 to about 0.7 µm, which, as discussed further herein, is compatible with the MFD suitable for optical propagation via a ridge-type thin film lithium-niobate (TFLN) optical waveguides of the Y-splitter 112, branches 114a-114b, and Y-combiner 116.

The Y-splitter 112 splits the optical signal received from the input MFD converter 110, and provides the split optical signals to the first and second optical signal branches 114a and 114b, respectively. The electric field generated by the DC bias voltage applied to the conductor 136 sets the quiescent index of refraction of the first and second optical signal branches 114a and 114b. The LNA 130 is configured to amplify the RF signal, and provide the amplified RF signal to the signal transmission line 132 of the coplanar stripline. The electric field of the amplified RF signal on the signal transmission line 132 affects the index of refractions of the first and second optical signal branches 114a and 114b in opposite (e.g., push-pull) manner. Accordingly, the phases of the optical signals propagating via the first and second optical signal branches 114a and 114b are modulated by the amplified RF signal on the signal transmission line 132. The termination resistor $R_T$ prevents or reduces reflections of the amplified RF signal at the second end of the signal transmission line 132.

The Y-combiner 116 combines the RF modulated optical signals from the first and second optical signal branches 114a and 114b, respectively. The combining of the RF modulated optical signals may be constructive or destructive based on respective phases of the RF modulated optical signals. The combined RF modulated optical signal is provided to the optional output MFD converter 118, which increases the MFD of the RF modulated optical signal from about 0.7 µm to about 9 µm for improved (e.g., less lossy) coupling of the optical signal to the optical fiber 119. The output single-mode optical fiber 119 then routes the RF modulated optical signal to a destination optical receiver. If the output MFD converter 118 is not present, the MFD of the modulated optical signal propagating via the optical fiber 119 eventually increases from 0.7 µm to about 9 µm with slightly more loss than with the output MFD converter 118 being present.

Figure 1B:
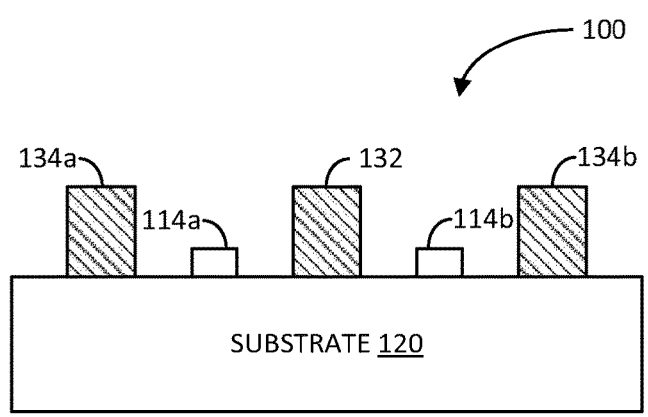
FIG. 1B illustrates a cross-sectional view of the example electro-optical modulator of FIG. 1A in accordance with another aspect of the disclosure.

FIG. 1B illustrates a cross-sectional view of the example electro-optical modulator 100 along an axis traverse of the optical signal propagation in the modulation region (e.g., the region proximate the first and second optical signal branches 114a and 114b) in accordance with another aspect of the disclosure. As shown, the electro-optical modulator 100 may be formed on a substrate 120 (e.g., single crystal quartz, fused silica, or silicon (Si) substrate). Also shown are the first and second optical signal branches 114a and 114b formed over and/or on the substrate 120. Additionally, the coplanar stripline including the signal transmission line 132 and the associated first and second grounded transmission lines 134a and 134b are also formed over and/or on the substrate 120.

In this configuration, the electro-optical modulator 100 may be described to have ridge waveguides 114a and 114b because the waveguides 114a and 114b form ridges above the substrate 120. The manner in which the waveguides 114a and 114b are formed is by a layer of thin-film lithium-niobate (TFLN) material being deposited on the substrate 120, and then the TFLN layer undergoes an etching process to form the waveguides 114a and 114b. Due to the ion slicing process used for the TFLN material fabrication on the substrate 120 and the following etching process to the film, the maximum thickness of the waveguides 114a and 114b that may be achieved is about 0.7 µm. As a result, the MFD of the optical signal propagating via the ridge waveguides 114a and 114b is also about 0.7 µm. This is the reason for the electro-optical modulator 100 includes the input and output MFD mode converters 110 and 118, as the MFD of the input and output single-mode optical fibers 109 and 119 at 9 µm is not compatible with the 0.7 µm MFD of the TFLN waveguides 114a and 114b. Although the input MFD mode converter 110 reduces the signal loss between the input single-mode optical fiber 109 and the Y-splitter 112, the signal loss is still significant at about five (5) decibels (dB).

Figure 2A:
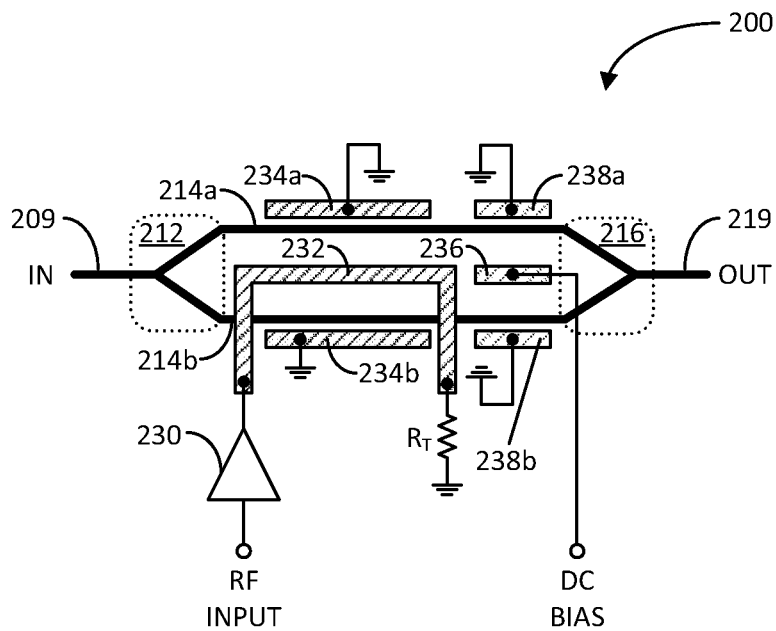
FIG. 2A illustrates a block diagram of another example electro-optical modulator with hybrid thick-film, large mode-field diameter in accordance with another aspect of the disclosure.

FIG. 2A illustrates a block diagram of another example electro-optical modulator 200 in accordance with an aspect of the disclosure. The electro-optical modulator 200 is similar to that of electro-optical modulator 100 and includes many similar elements indicated with the same reference numbers with the exception that the most significant digit (MSD) in electro-optical modulator 200 is a "2" instead of "1" as in electro-optical modulator 100. This modulator configuration 200 without the mode converter is favored in many applications due to its high-power handling capability and the low interface losses.

A difference between the electro-optical modulator 200 and the electro-optical modulator 100 is that the TFLN waveguides 212, 214a-b, and 216 are manufactured to have an MFD of about 8 µm, which is significantly more compatible with the MFD of 9 µm of the input and output single-mode optical fibers 209 and 219. As a result, the input and output MFD converters 110 and 118 in electro-optical modulator 100 are not needed in electro-optical modulator 200. Further, as discussed in more detail herein, the electro-optical modulator 200 may be configured to improve a matching of the optical signal velocity and the RF signal velocity such that the signal losses through the electro-optical modulator 200 may be reduced to about 1.7 dB.

Figure 2B:
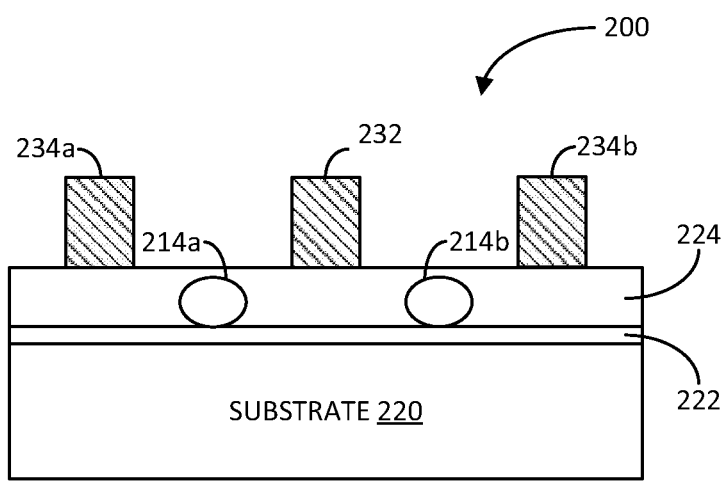
FIG. 2B illustrates a cross-sectional view of the example electro-optical modulator of FIG. 2A in accordance with another aspect of the disclosure.

FIG. 2B illustrates a cross-sectional view of the example electro-optical modulator 200 along an axis traverse of the optical signal propagation in the modulation region (e.g., the region proximate the first and second optical signal branches 214a and 214b) in accordance with another aspect of the disclosure. As shown, the electro-optical modulator 200 may be formed on a substrate 220 (e.g., single crystal quartz, fused silica, or silicon (Si) substrate). The electro-optical modulator 200 further includes a bonding layer 222 disposed over and/or on the substrate 220. The bonding layer 222 may include different types of polymer-based materials, such as ultraviolet (UV) epoxy or glue, benzocyclobutene (BCB) polymer, SU-8 polymer, dry film photoresist, bonding sheet, and other types of polymers. The bonding layer 222 may also include dielectric-based materials, such as Si nano-adhesive bond using $SiO_2/SiN_xO_y$ middle layer, or fusion bond $SiO_2/SiN_xO_y$ middle layer, or others.

The electro-optical modulator 200 includes a lithium-niobate (LN) wafer 224 including optical waveguides 214a and 214b embedded therein. The LN wafer 224 is disposed over and/or on the bonding layer 222. That is, the bonding layer 222 serves to bond the LN wafer 224 to the substrate 220. As discussed further herein, the optical waveguides 214a and 214b may be formed by titanium (Ti)-diffusion of the LN wafer 224 at such regions, or by annealed proton exchange (APE) at such regions. The electro-optical modulator 200 further includes the signal transmission line 232 and associated first and second grounded transmission lines 234a and 234b of the coplanar stripline disposed over and/or on the LN wafer 224. The coplanar stripline may be formed of any suitable electrical conductor, such as gold (Au) or other suitable metals.

As the optical waveguides 214a and 214b are not formed by ion slicing of TFLN material, but rather from an LN wafer with a thickness of greater than 500 μm, and then subsequently thinned by chemical-mechanical polishing (CMP) to a thickness of about 7 μm, the MFD of the optical waveguides 214a and 214b of the electro-optical modulator 200 may be made to be more compatible with the MFD of 9 μm of the single-mode optical fibers 209 and 219.

Figure 3:
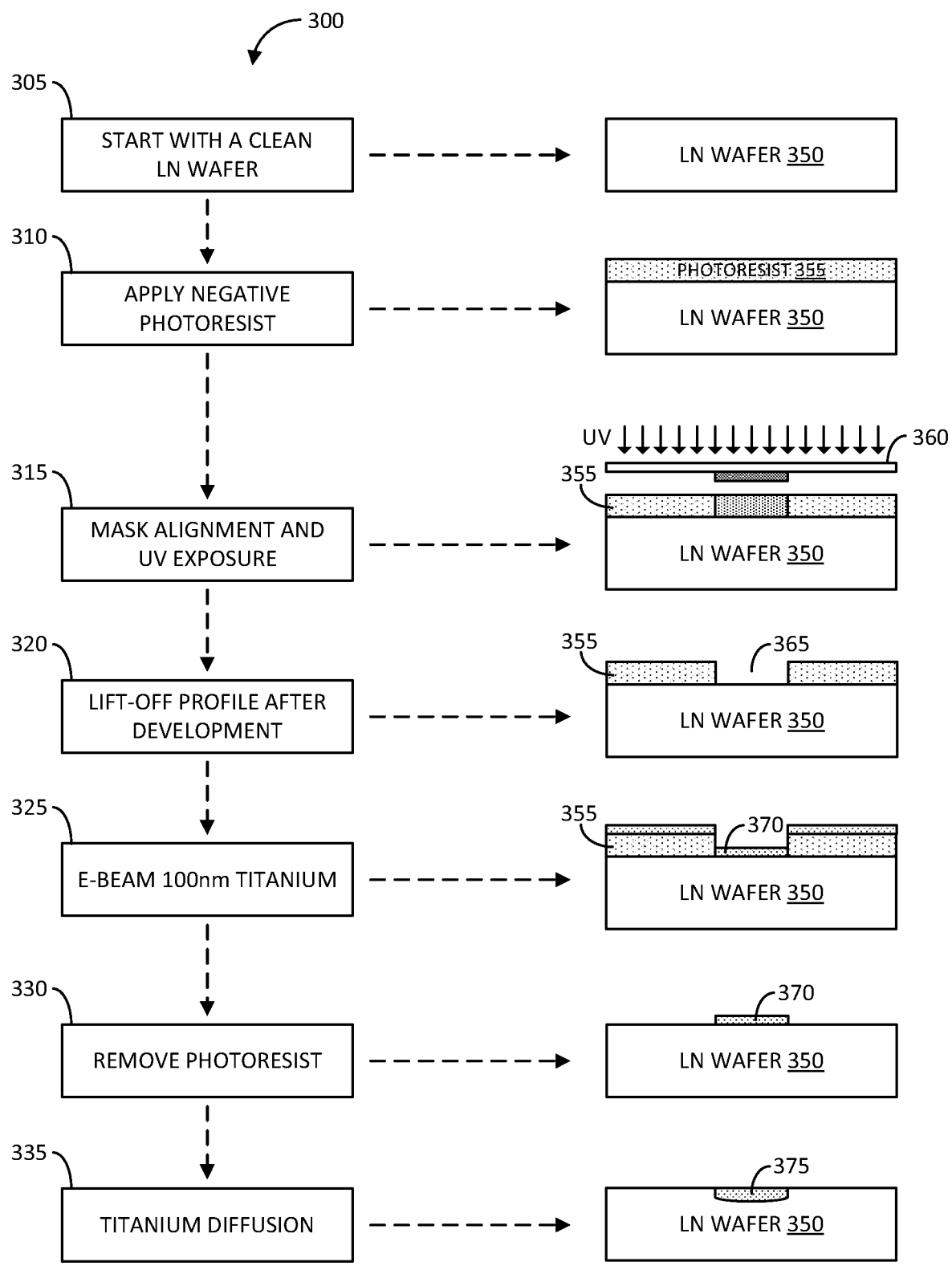
FIG. 3 illustrates a cross-sectional view of an example lithium-niobate (LN) wafer including a titanium (Ti) optical waveguide at various stages of an example fabrication method in accordance with another aspect of the disclosure.

FIG. 3 illustrates a cross-sectional view of an LN wafer 350 including an optical waveguide 375 at various stages of an example method 300 of making the same in accordance with another aspect of the disclosure. The method 300 may be a Ti-diffusion method of making the LN wafer 224 including the optical waveguides 214a and 214b.

The method 300 may begin with a clean LN wafer 350 (block 305). The method 300 includes applying a photoresist (e.g., negative) layer 355 over and/or on the LN wafer 350 (block 310). The method 300 further includes alignment of a mask 360 to the photoresist 355/LN wafer 350, and subjecting the masked photoresist 355 to UV exposure (block 315). Further, the method 300 includes developing the photoresist 355 to form a window 365 through which Ti diffusion may take place (block 320). The method 300 additionally includes electron beam (E-beam) deposition of Ti 370 (e.g., a 100 nm thick layer of Ti) (block 325). Then, according to the method 300, the photoresist 355 (including the Ti layer on top of it) are removed (block 330). Finally, the method 300 includes diffusing the Ti 370 into the LN wafer 350 to form an optical waveguide 375 (block 335). The Ti increases the index of refraction of the LN material in the waveguide region 375 by about +0.01 compared to the index of refraction of the LN wafer 350.

Figures 1, 4:
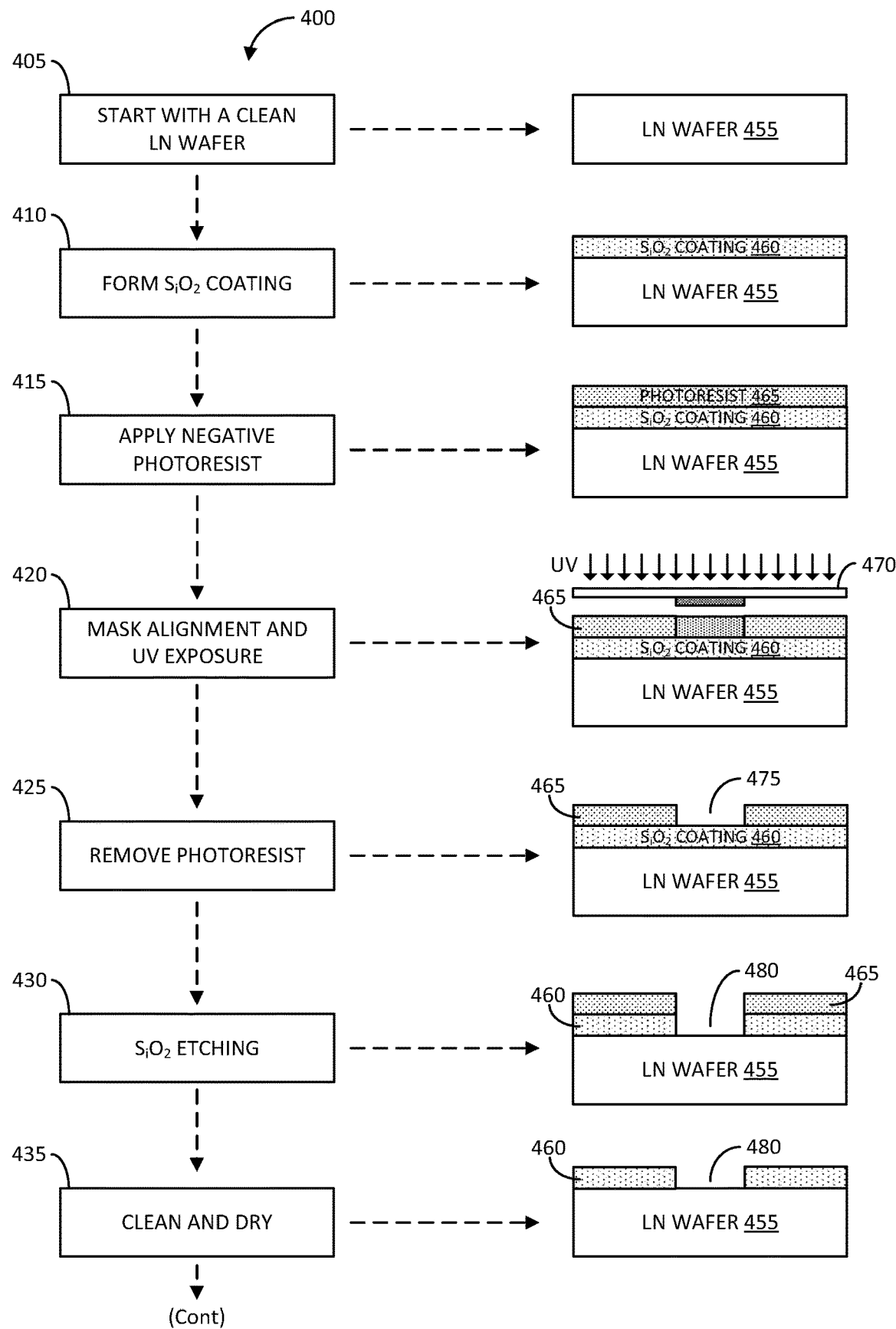
FIGS. 4-1 to 4-2 illustrate a cross-sectional view of another example lithium-niobate (LN) wafer including an annealed proton exchange (APE) optical waveguide at various stages of an example fabrication method in accordance with another aspect of the disclosure.
Figures 2, 4:
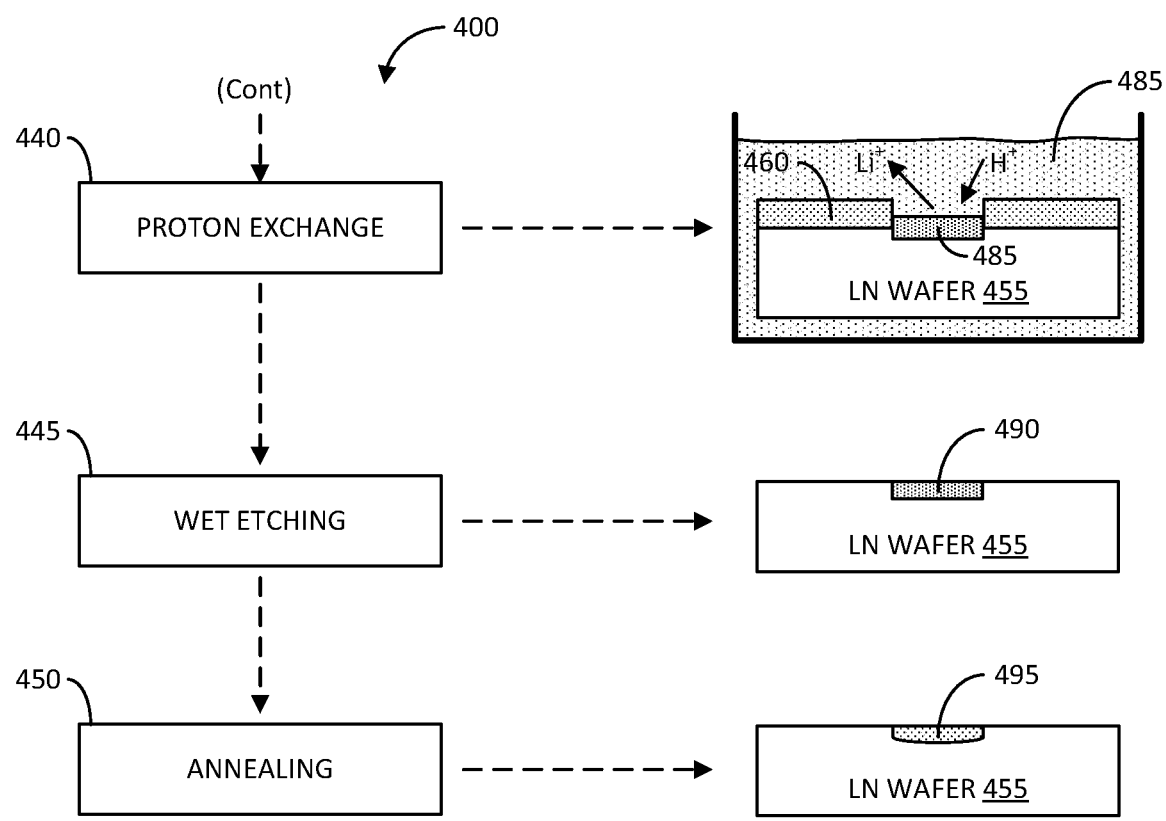

FIGS. 4-1 and 4-2 illustrate a cross-sectional view of an LN wafer 455 including an optical waveguide 495 at various stages of an example method 400 of making the same in accordance with another aspect of the disclosure. The method 400 may be the APE method of making the LN wafer 224 including the optical waveguides 214a and 214b.

With reference to FIG. 4-1, the method 400 may begin with a clean LN wafer 455 (block 405). The method 400 includes depositing a layer of silicon-oxide ($SiO_2$) 460 over and/or on the LN wafer 455 (block 410). The method 400 further includes applying a photoresist (e.g., negative) layer 465 over and/or on the $SiO_2$ layer 460 (block 415). The method 400 also includes alignment of a mask 470 to the photoresist 465/LN wafer 455, and subjecting the masked photoresist 465 to UV exposure (block 420). Further, the method 400 includes developing and removing the photoresist 465 to form a window 475 through which proton exchange may take place (block 425). The method 400 additionally includes etching the $SiO_2$ layer 460 directly under the window 475 to form a window 480 to the LN wafer 455 (block 430).

Further, the method 400 includes cleaning and drying the LN wafer 455 including the window 480 through the $SiO_2$ layer 460 (block 435). Then, with further reference to FIG. 4-2, according to the method 400, the LN wafer 455 including the window 480 through the $SiO_2$ layer 460 is placed in a bath of benzoic acid 485, which causes an exchange of hydrogen protons ($H^+$) in the benzoic acid 485 with lithium protons ($Li^+$) in the LN wafer 455 in the region exposed by the $SiO_2$ window 480 to form a region 490 of higher index of refraction compared to the unexposed LN wafer 455 (block 440). Then, according to the method 400, the LN wafer 455 including the $SiO_2$ layer 460 is wet etched to remove the remaining $SiO_2$ layer (block 445). Finally, the method 400 includes annealing the LN wafer 455 to more uniformly spread the hydrogen protons ($H^+$) to form an optical waveguide 495 (block 450).

Figure 5:
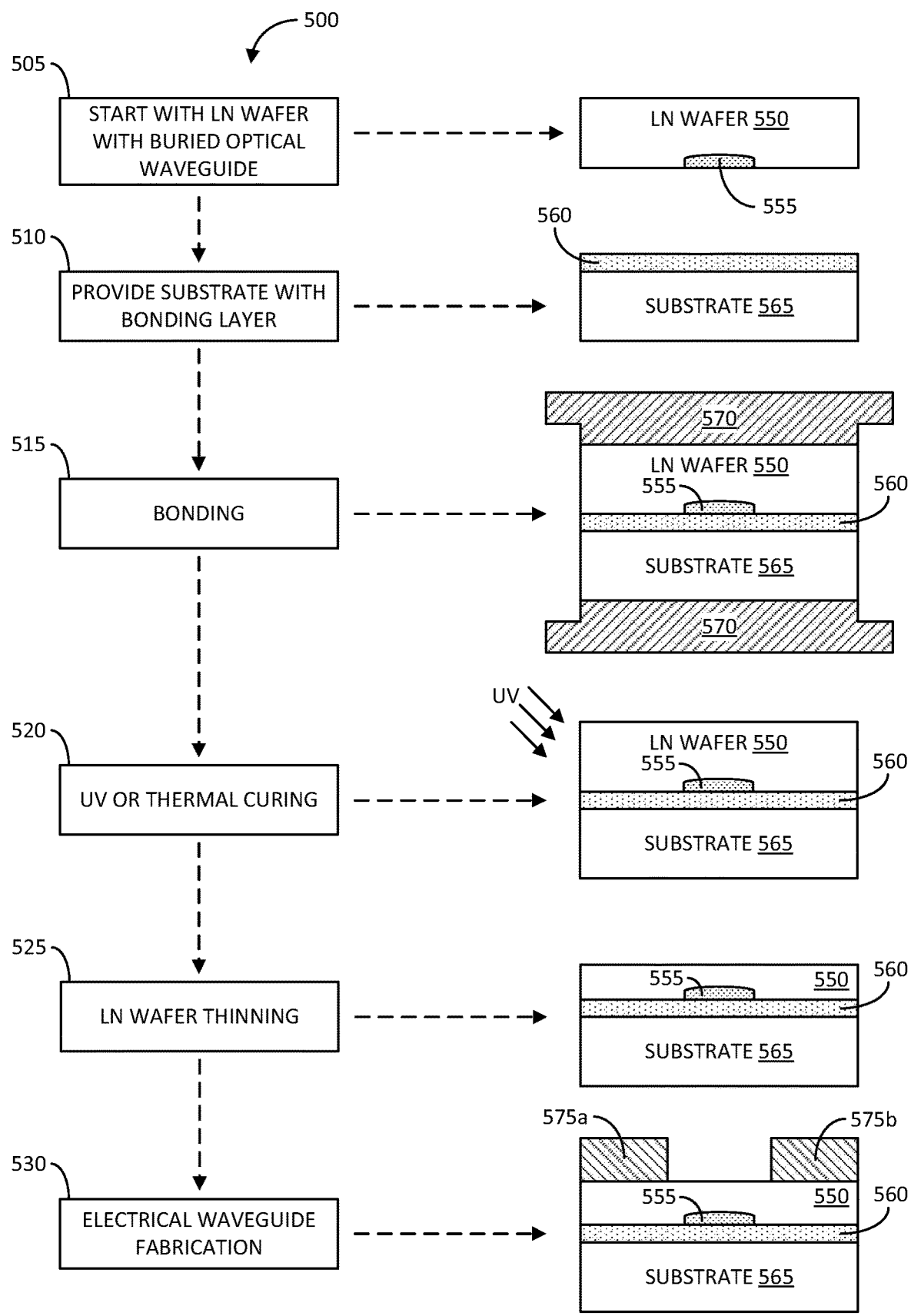
FIG. 5 illustrates a cross-sectional view of an example electro-optical modulator at various stages of an example method of wafer-substrate bonding and thinning in accordance with another aspect of the disclosure.

FIG. 5 illustrates a cross-sectional view of an example electro-optical modulator at various stages of a method 500 of making the same in accordance with another aspect of the disclosure. The method 500 includes beginning with a LN wafer 550 including an optical waveguide 555 formed therein (block 505). The LN wafer 550 including the embedded (buried) optical waveguide 555 may have been formed using the Ti-diffusion method 300 or the APE method 400 previously discussed. As illustrated, the optical waveguide 555 may be vertically closer to a top or first side than to a bottom or second (opposite) side of the LN wafer 550. As discussed in more detail further herein, wafer identification marking may be formed (e.g., using a laser) on the bottom or second side of the LN wafer 550.

The method 500 further includes providing a substrate 565 (e.g., single crystal quartz, fused silica, or silicon (Si) substrate) including a bonding layer 560 (block 510). The LN wafer 550 is then attached to the substrate 565 such that the top or first side (the side on which the optical waveguide 555 is closer) of the LN wafer 550 faces and makes contact to the bonding layer 560 (block 515). The bonding layer 560 may be disposed on a top or first side of the substrate 565. Thus, the bonding layer 560 is sandwiched between the respective top or first sides of the LN wafer 550 and the substrate 565. As previously discussed with respect to bonding layer 222, the bonding layer 560 may be formed of different types of polymer-based materials or different types of dielectric-based materials.

Then, according to the bonding procedure 515 of the method 500, the LN wafer 550 is pressure biased against the substrate 565 by a clamping structure 570 to securely bond the LN wafer 550 to the substrate 565. The method 500 further entails the attached LN wafer 550 and substrate 565 being subjected to UV or thermal curing to cure the bonding layer 560 (block 520). Additionally, the method 500 includes thinning of LN wafer 550 by polishing (e.g., CMP) the bottom or second side of the LN wafer 550. For example, the LN wafer 550 may be polished to reduce its original thickness of greater than 500 μm to about 7 μm. Finally, according to the method 500, the coplanar stripline transmission lines 575a and 575b are formed on the polished bottom or second side of the LN wafer 550 (block 530). As shown, the coplanar stripline transmission lines 575a and 575b are laterally on either side of the optical waveguide 555, as in coplanar transmission lines 234a and 232 being on either side of the first optical waveguide branch 214a, and the coplanar transmission lines 232 and 234b being on either side of the second optical waveguide branch 214b.

Figure 6:
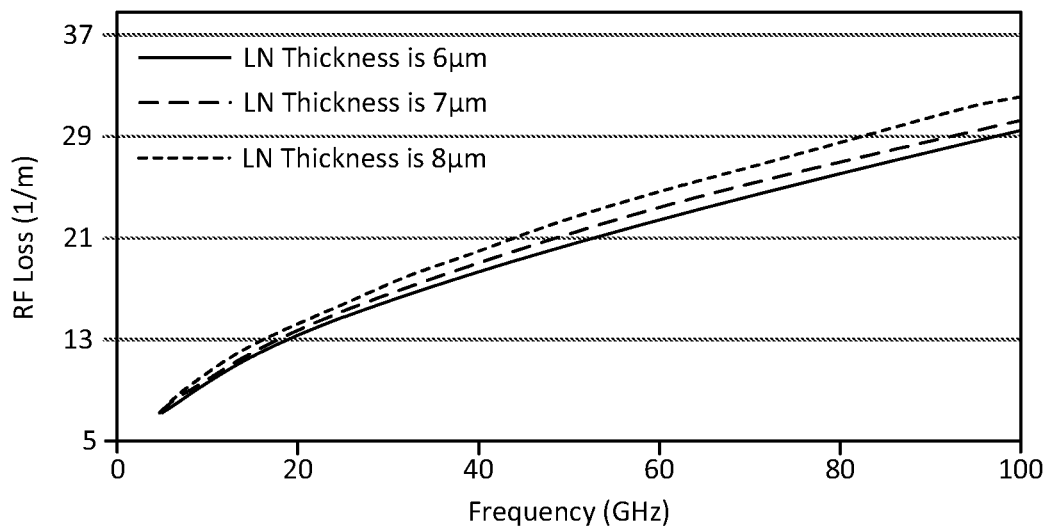
FIG. 6 illustrates a graph of an example radio frequency (RF) signal loss versus frequency characteristic of the electro-optical modulator of FIG. 2A in accordance with another aspect of the disclosure.

FIG. 6 illustrates a graph of an example radio frequency (RF) signal loss versus frequency characteristic of the electro-optical modulator 200 in accordance with another aspect of the disclosure. The x- or horizontal axis represents frequency in gigahertz (GHz) from 0 Hz to 100 GHz. The y- or vertical axis represents RF loss in one over meter (1/m) units from 5 to greater than 37. The graph depicts the RF loss versus frequency characteristic for three (3) different thickness of the LN wafer 550: the solid line characteristic for a thickness of 6 μm, the larger dashed line characteristic for a thickness of 7 μm, and the smaller dashed line characteristic for a thickness of 8 μm. As these characteristics show, the RF loss versus frequency is similar for all three thicknesses of the LN wafer 550, with the thinner LN wafer 550 having slightly lower RF losses, which improves over higher frequencies.

Figure 7:
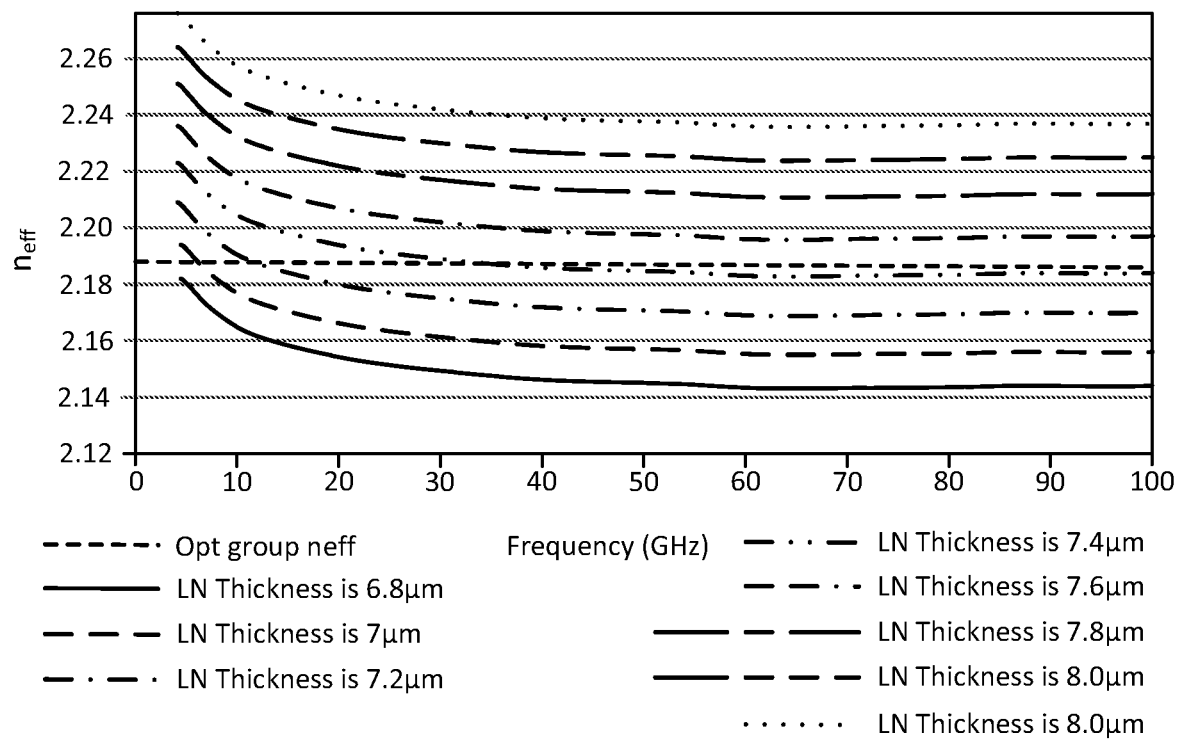
FIG. 7 illustrates a graph of an example effective index of refraction (signal velocity) versus frequency characteristic of the electro-optical modulator of FIG. 2A in accordance with another aspect of the disclosure.

FIG. 7 illustrates a graph of an example effective index of refraction $n_{eff}$ (signal velocity) versus frequency characteristic of the electro-optical modulator 200 in accordance with another aspect of the disclosure. The x- or horizontal axis represents frequency in gigahertz (GHz) from 0 Hz to 100 GHz. The y- or vertical axis represents effective index of refraction $n_{eff}$ from 2.12 to 2.28 for both RF signal and optical wave. The signal velocity is related to the speed of the signal in a vacuum "c" divided by the effective index of refraction $n_{eff}$ (e.g., velocity=$c/n_{eff}$).

The horizontal dashed line at slightly higher than $n_{eff}$=2.18 represents the optical group velocity via the first and second optical waveguide branches 214a and 214b. With regard to RF signal velocity via the coplanar transmission line 232, the graph depicts the effective index of refraction $n_{eff}$ versus frequency characteristic for eight (8) different (lowest-to-highest) thickness of the LN wafer 550: the solid line characteristic for a thickness of 6.8 μm, the dashed line characteristic for a thickness of 7.0 μm, the dash-dot line characteristic for a thickness of 7.2 μm, the dash-double-dot line characteristic for a thickness of 7.4 μm, the double-dash-dot line characteristic for a thickness of 7.6 μm, the long-short-dash line characteristic for a thickness of 7.8 μm, the long-double-short dash line characteristic for a thickness of 8.0 μm, and the dotted line characteristic for a thickness of 8.2 μm.

As these characteristics show, the optical group velocity and the velocity of the RF signal are more similar when the thickness of the LN wafer 550 is 7.4 μm, as compared to other indicated thicknesses of the LN wafer 550. As discussed further herein, relatively low modulator loss over a relatively wide bandwidth (BW) may be achieved when the RF signal velocity substantially matches the optical group velocity.

Figure 8A:
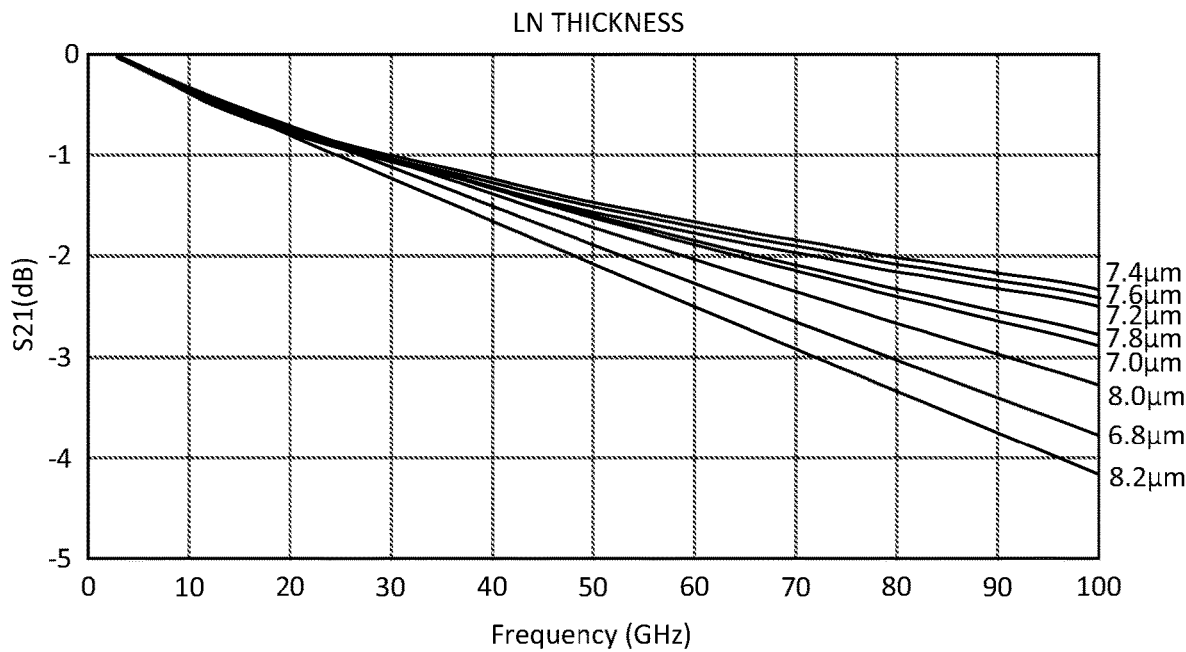
FIG. 8A illustrates a graph of an example electrical to optical conversion response (S21) versus frequency characteristic of the electro-optical modulator of FIG. 2A in accordance with another aspect of the disclosure.

FIG. 8A illustrates a graph of an example normalized electrical to optical (E2O) conversion response (S21) versus frequency characteristic of the electro-optical modulator 200 in accordance with another aspect of the disclosure. The x- or horizontal axis represents frequency in gigahertz (GHz) from 0 Hz to 100 GHz. The y- or vertical axis represents the S21 parameter in dB from 0 dB to −10 dB.

The graph depicts the S21 versus frequency characteristic for eight (8) different thicknesses of the LN wafer 550: As indicated in FIG. 8A, the thicknesses include 6.8 μm, 7.0 μm, 7.2 μm, the 7.4 μm, the 7.6 μm, 7.8 μm, 8.0 μm, and 8.2 μm.

As these characteristics show, the modulator S21 over frequency drops significantly less when the thickness of the LN wafer 550 is 7.4 μm, as compared to the other indicated thicknesses of the LN wafer 550. For instance, the relatively flat S21 over a relatively wide bandwidth (BW) (e.g., >100 GHz) may be achieved when the thickness of the LN wafer 550 results in the RF signal velocity substantially matching the optical group velocity.

Figure 8B:
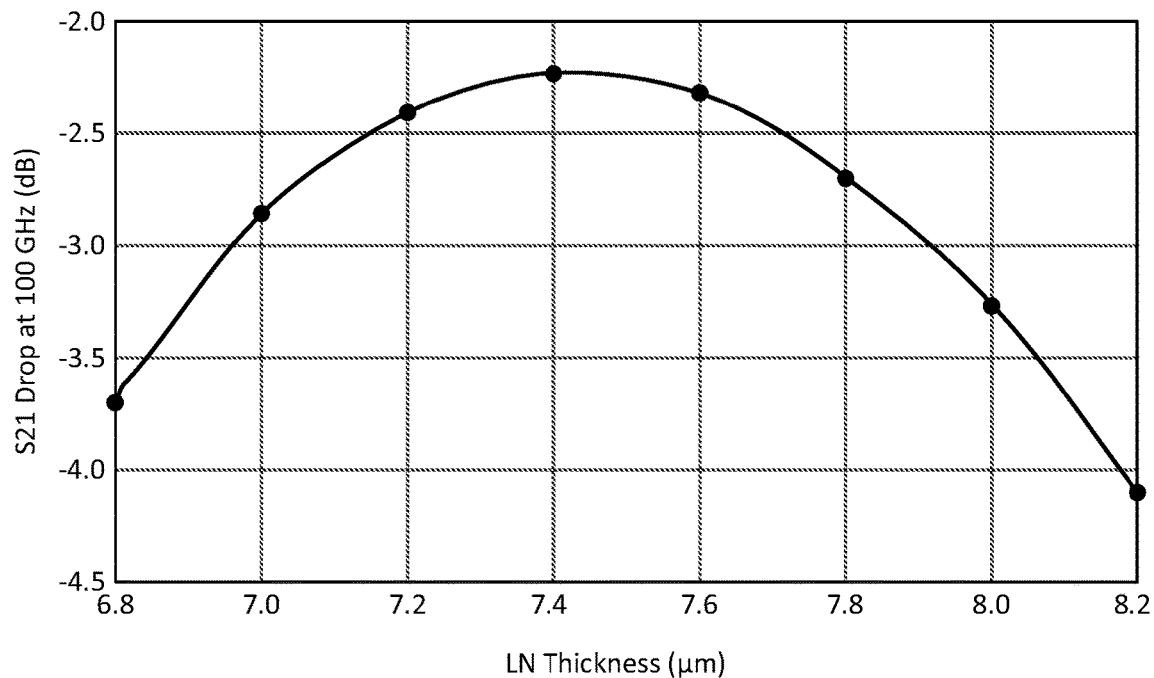
FIG. 8B illustrates a graph of an example S21 drop versus thickness of a lithium niobate (LN) waveguide at 100 GHz frequency of the electro-optical modulator of FIG. 2A in accordance with another aspect of the disclosure.

FIG. 8B illustrates a graph of an example S21 versus thickness of a lithium niobate (LN) waveguide at 100 GHz frequency of the electro-optical modulator 200 in accordance with another aspect of the disclosure. The x- or horizontal axis represents the thickness of the LN wafer 550 from 6.8 μm to 8.2 μm. The y- or vertical axis represents the S21 parameter in dB from −2.0 dB to −4.5 dB. The S21 parameter is normalized to a frequency of 5 GHz. As the graph illustrates, the insertion loss or S21 is minimum at a LN wafer thickness of 7.4 μm (e.g., at about −2.3 dB), which coincides with the thickness that results in the RF signal velocity substantially matching the optical group velocity.

Figure 9:
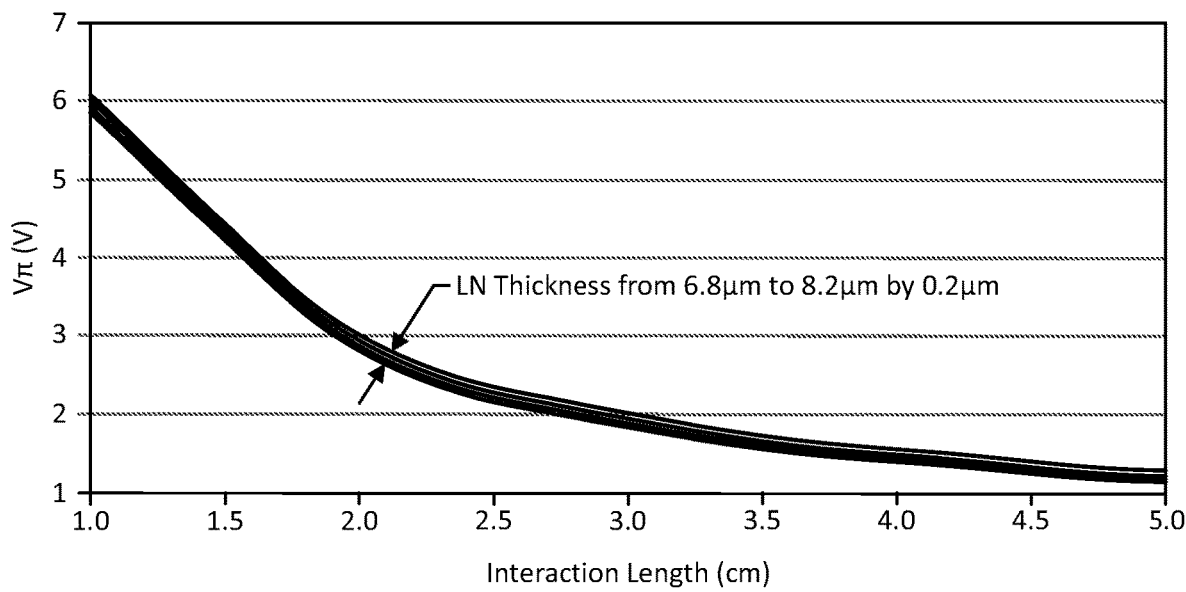
FIG. 9 illustrates a graph of an example half-wave voltage ($V_\pi$) versus RF-optical interaction length of the electro-optical modulator of FIG. 2A in accordance with another aspect of the disclosure.

FIG. 9 illustrates a graph of an example half-wave voltage ($V_\pi$) versus RF-optical interaction length of the electro-optical modulator 200 in accordance with another aspect of the disclosure. The x- or horizontal axis represents the interaction length in centimeters (cm) (e.g., the length at which the coplanar transmission line 232/234a-b is parallel with and situated proximate the first and second optical waveguide branches 214a-b) from 1 cm to 5 cm. The y- or vertical axis represents the half-wave voltage ($V_\pi$) in Volts (V) from 1V to 7V. The half-wave voltage ($V_\pi$) is the voltage of the RF signal on the coplanar transmission line 232/234a-b that produces a 180 degree phase change between the optical signals propagating via the first and second optical waveguide branches 214a-b; or it may be referred to as the voltage that produces an output signal on/off transition of the electro-optical modulator 200.

The graph depicts the half-wave voltage ($V_\pi$) versus RF-optical interaction length characteristic for various different thickness of the LN wafer 550: 6.8 μm, 7.0 μm, 7.2 μm, 7.4 μm, 7.6 μm, 7.8 μm, 8.0 μm, and 8.2 μm. As these characteristics show, the half-wave voltage $V_\pi$ is similar for all eight (8) thicknesses of the LN wafer 550. For example, the half-wave voltage $V_\pi$ is about 2.3V at an interaction length of 2.5 cm, which may be a suitable operating point for the electro-optical modulator 200.

Figure 10:
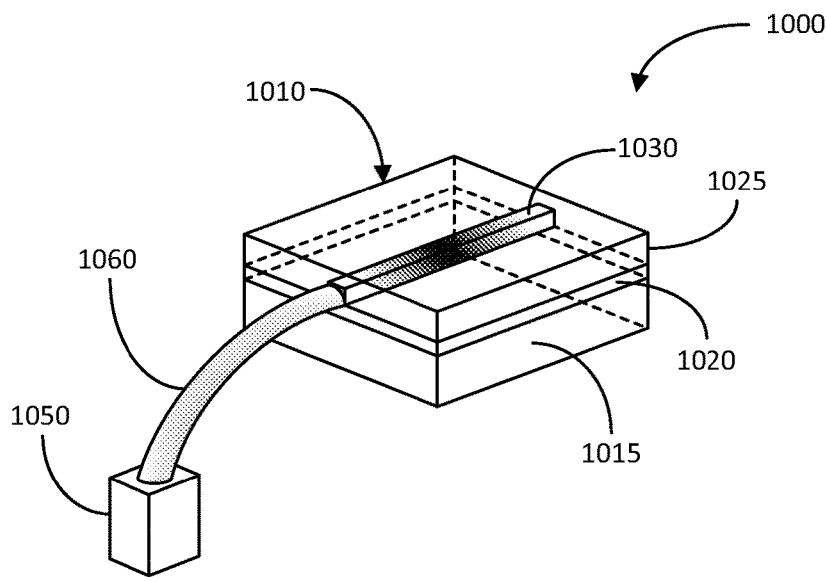
FIG. 10 illustrates a perspective view of another example optical signal transmitter associated with a light source integration method in accordance with another aspect of the disclosure.

FIG. 10 illustrates a perspective view of another example optical signal transmitter 1000 in accordance with another aspect of the disclosure. The optical signal transmitter 1000 includes a laser source (e.g., chip) 1050, an electro-optical modulator 1110, and an optical waveguide 1060 optically coupling the laser source 1050 to the electro-optical modulator 1010.

The electro-optical modulator 1010 may be implemented per electro-optical modulator 200 previously discussed. As illustrated, the electro-optical modulator 1010 includes a substrate 1015 (e.g., single crystal quartz, fused silica, or silicon (Si) substrate), a bonding layer 1020 (e.g., a polymer-based or dielectric-based material, as previously discussed) disposed over and/or on the substrate 1015, and a LN wafer 1025 including an optical waveguide 1030 disposed over and/or on the bonding layer 1020. As the discussion with respect to optical signal transmitter 1000 pertains to the optical domain, the electro-optical modulator 1010 is not illustrated with the coplanar transmission lines and DC bias conductors; but it shall be understood that the electro-optical modulator 1010 may include those elements as well.

The laser source 1050 may be configured to generate a CW optical signal. For example, the laser source 1050 may be a distributed feedback (DFB) laser source. The optical waveguide 1060 may be implemented as a polymer microwire, a single-mode optical fiber, an optical foldback path configuration as described in copending application, Ser. No. 17/826,023, entitled "Optical Signal Transmitter Including Folded Coupling Configuration of Laser Source to Microwave Photonic Integrated Circuit" commonly assigned to Optilab, LLC.

Figure 11:
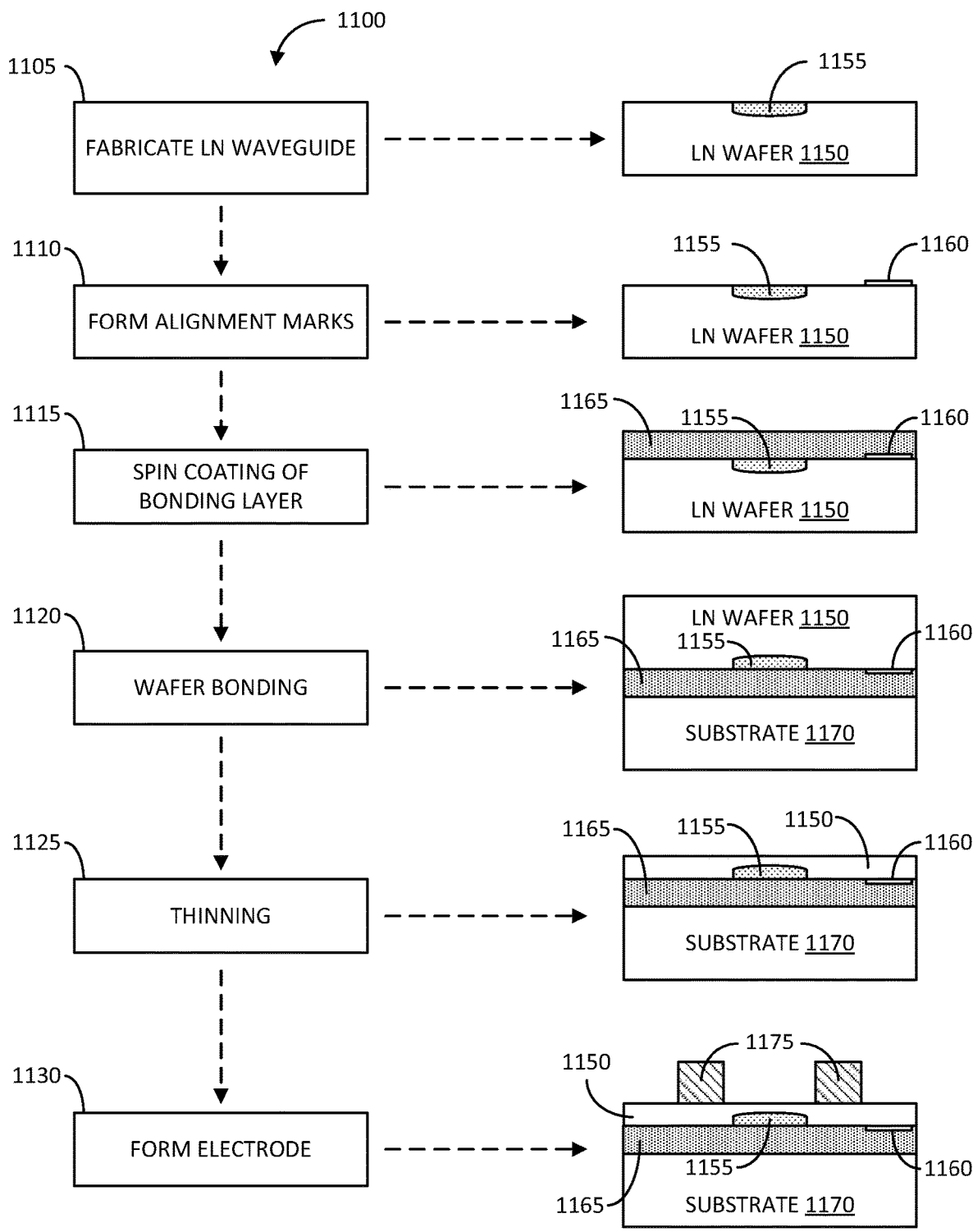
FIG. 11 illustrates a cross-sectional view of an example electro-optical modulator at various stages of an example method of electrode fabrication and alignment with optical waveguide in accordance with another aspect of the disclosure.

FIG. 11 illustrates a cross-sectional view of an example electro-optical modulator at various stages of a method 1100 of making and alignment marking the same in accordance with another aspect of the disclosure. The method 1100 includes fabricating an LN wafer 1150 including an optical waveguide 1155 formed therein (block 1105). The LN wafer 1150 including the embedded optical waveguide 1155 may have been formed using the Ti-diffusion method 300 or the APE method 400 previously discussed. As illustrated, the optical waveguide 1155 may be vertically closer to a top or first side compared to a bottom or second (opposite) side of the LN wafer 1150.

The method 1100 further includes forming an alignment marking 1160 on the top or first side of the LN wafer 1150 (block 1110). The alignment marking 1160 may be formed by depositing chromium (Cr) or chromium-silicon (Cr—Si), and subsequent patterning. The method 1100 may further include forming (e.g., spin coating) a bonding layer 1165 (e.g., a polymer-based material, such as UV epoxy or glue, BCB polymer, SU-8 polymer, dry film photoresist, bonding sheet, or other polymers, or a dielectric-based material, such as Si nano-adhesive bond USING $SiO_2/SiN_xO_y$ middle layer, or fusion bond using $SiO_2/SiN_xO_y$ middle layer, or others) over or on the top or first side of the LN wafer 1150 (block 1115). Then, according to the method 1100, the LN wafer 1150 is attached to a substrate 1170 (e.g., single crystal quartz, fused silica, or silicon (Si) substrate) via the bonding layer 1165. Note that the top or first side of the LN wafer 1150 faces and is attached to the bonding layer 1165.

Then, according to the method 1100, the LN wafer 1150 is thinned by polishing (e.g., CMP) its bottom or second side (block 1125). For example, the LN wafer 1150 may be polished to reduce its original thickness of greater than 500 µm to about 7 µm. Finally, according to the method 1100, the coplanar stripline transmission lines 1175 are formed on the polished bottom or second side of the LN wafer 1150 (block 1130). The alignment marking 1160 may be used to properly align the mask used to form the coplanar stripline transmission lines 1175.

Figure 12:
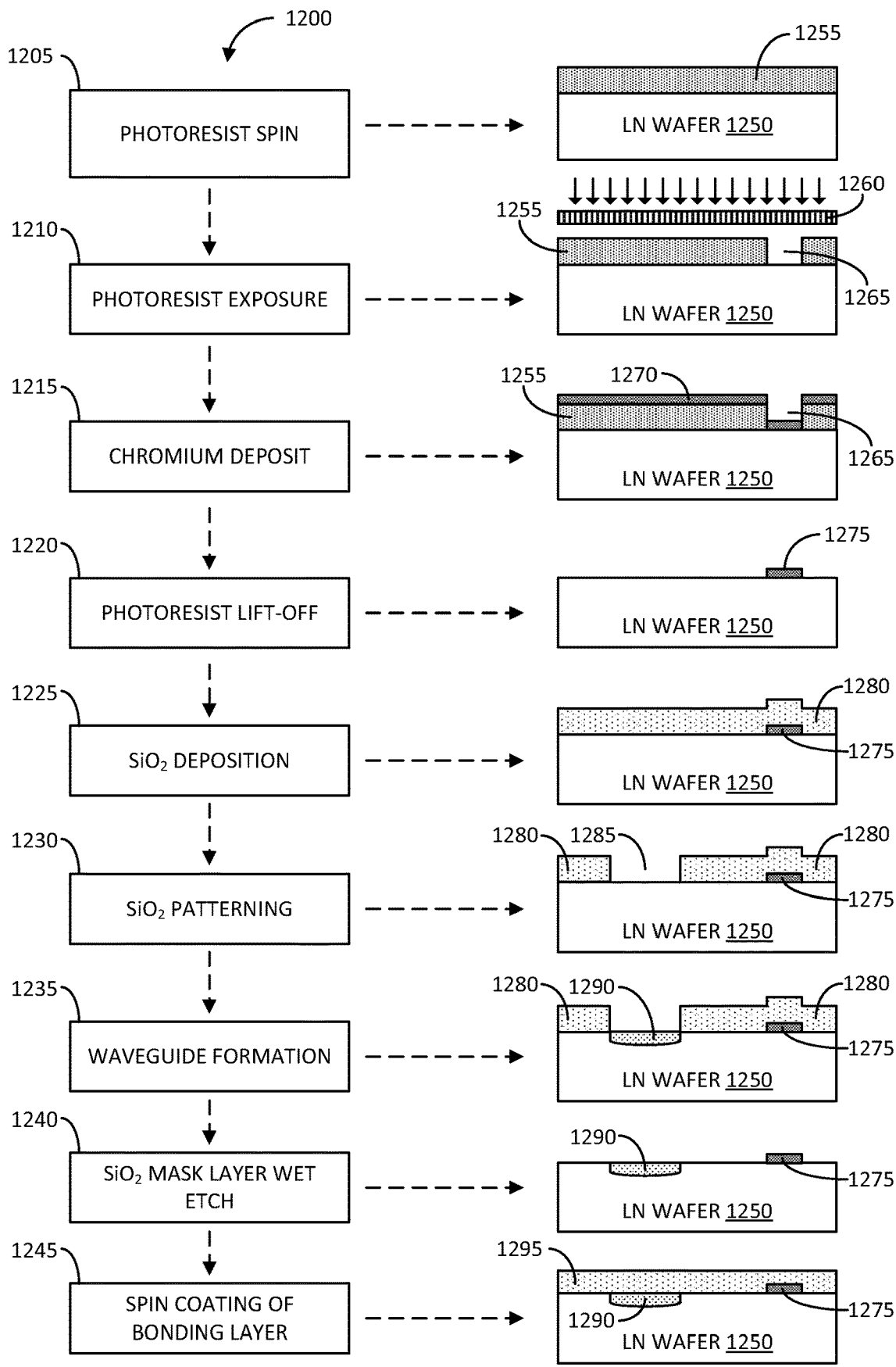
FIG. 12 illustrates a cross-sectional view of an example electro-optical modulator at various stages of an example method of alignment marks fabrication for APE waveguide wafers in accordance with another aspect of the disclosure.

FIG. 12 illustrates a cross-sectional view of an example electro-optical modulator at various stages of a method 1200 of making and alignment marking the same in accordance with another aspect of the disclosure. The method 1200 includes forming (e.g., spinning) photoresist 1255 on a top or first side of a LN wafer 1250 (block 1205). The method 1200 further includes exposing the photoresist 1255 using a mask 1260 to form an alignment marking window 1265 down to the top or first side of the LN wafer 1250 (block 1210). Additionally, the method 1200 includes forming (e.g., depositing) a layer of chromium (Cr) or chromium-silicon (Cr—Si) 1270 over and/or on the photoresist 1255 and on the top or first side of the LN wafer 1250 below the window 1265 (block 1215). The method 1200 also includes removing the photoresist 1255; thereby, leaving the Cr or Cr—Si alignment marking 1275 on the top or first side of the LN wafer 1250 (block 1220).

The method 1200 further includes forming (e.g., depositing) a layer of silicon-oxide ($SiO_2$) 1280 over and/or on the top or first side of the LN wafer 1250 and the alignment marking 1275 (block 1225). Additionally, the method 1200 includes patterning the $SiO_2$ layer 1280 to form a window 1285 down to the top or first side of the LN wafer 1250 (block 1230). Then, according to the method 1200, the LN wafer 1250 is subjected to an APE waveguide fabrication process to form the optical waveguide 1290 within the LN wafer 1250 below the window 1285 (block 1235). Further, the method 1200 includes removing the $SiO_2$ layer 1280, for example, by wet etching (block 1240). Finally, the method 1200 includes forming the bonding layer 1290 over and/or on the top or first side of the LN wafer 1250, including over the optical waveguide 1290 and the alignment marking 1275 (block 1245).

Figure 13:
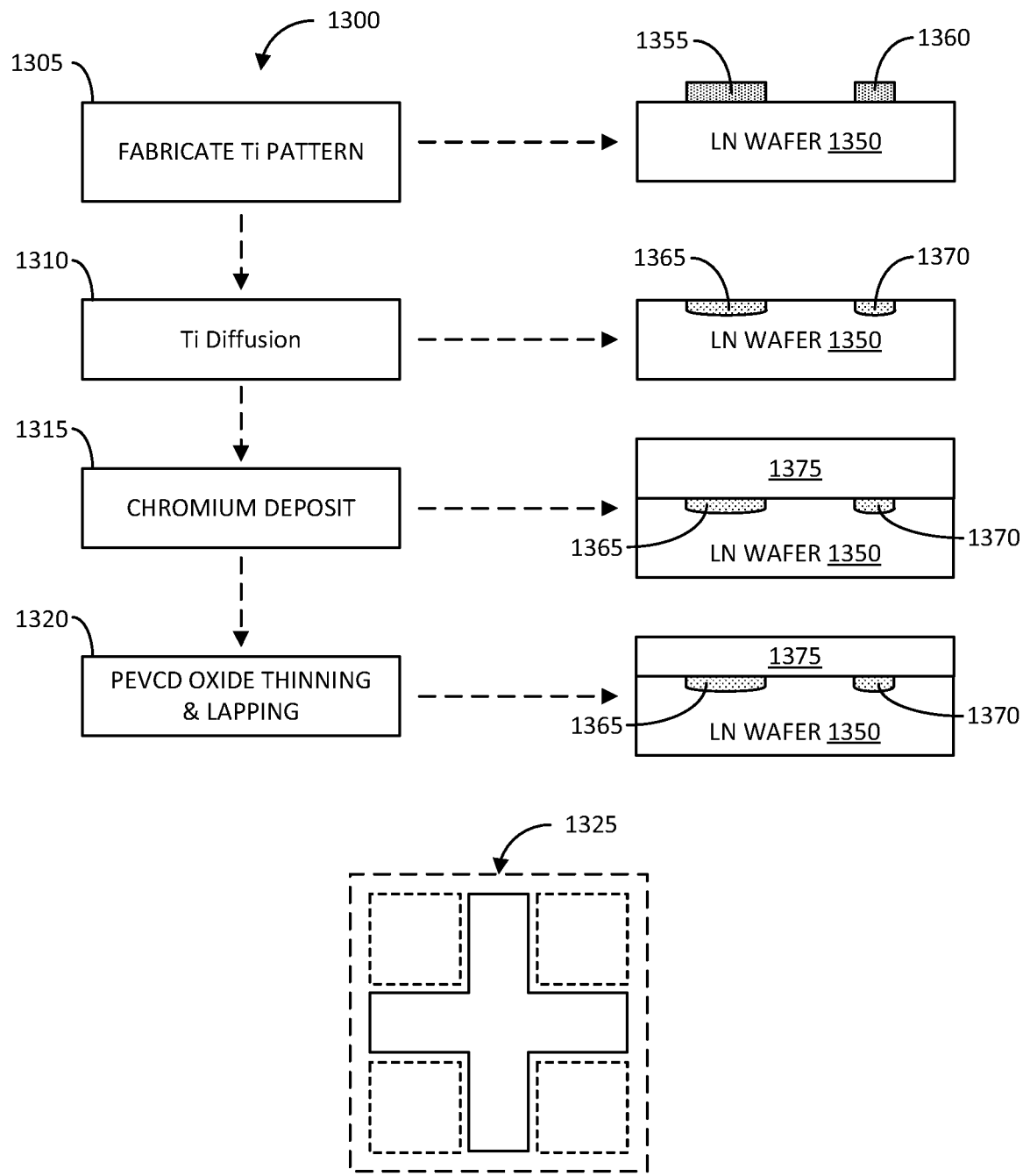
FIG. 13 illustrates a cross-sectional view of an example electro-optical modulator at various stages of an example method of alignment marks fabrication for Ti waveguide wafers in accordance with another aspect of the disclosure.

FIG. 13 illustrates a cross-sectional view of an example electro-optical modulator at various stages of a method 1300 of making and alignment marking the same in accordance with another aspect of the disclosure. The method 1300 includes forming a titanium (Ti) pattern 1355 and 1360 over and/or on a top or first side of an LN wafer 1350 (block 1305). The method 1300 further includes diffusing the Ti patterns 1355 and 1360 to form the optical waveguide 1365 and the alignment marking 1370 within the LN wafer 1350 proximate the top or first side thereof (block 1310). Additionally, the method 1300 includes forming (e.g., by plasma-enhanced chemical vapor deposition (PECVD)) a layer of silicon-oxide ($SiO_2$) 1375 over and/or on the top or first side of the LN wafer 1350 including over the optical waveguide 1365 and the alignment marking 1370 (block 1315). The method 1300 also includes thinning and lapping the $SiO_2$ layer 1375 (block 1370). A plan view of an example of a Ti alignment marking 1325 is also shown in FIG. 13.

Figure 14:
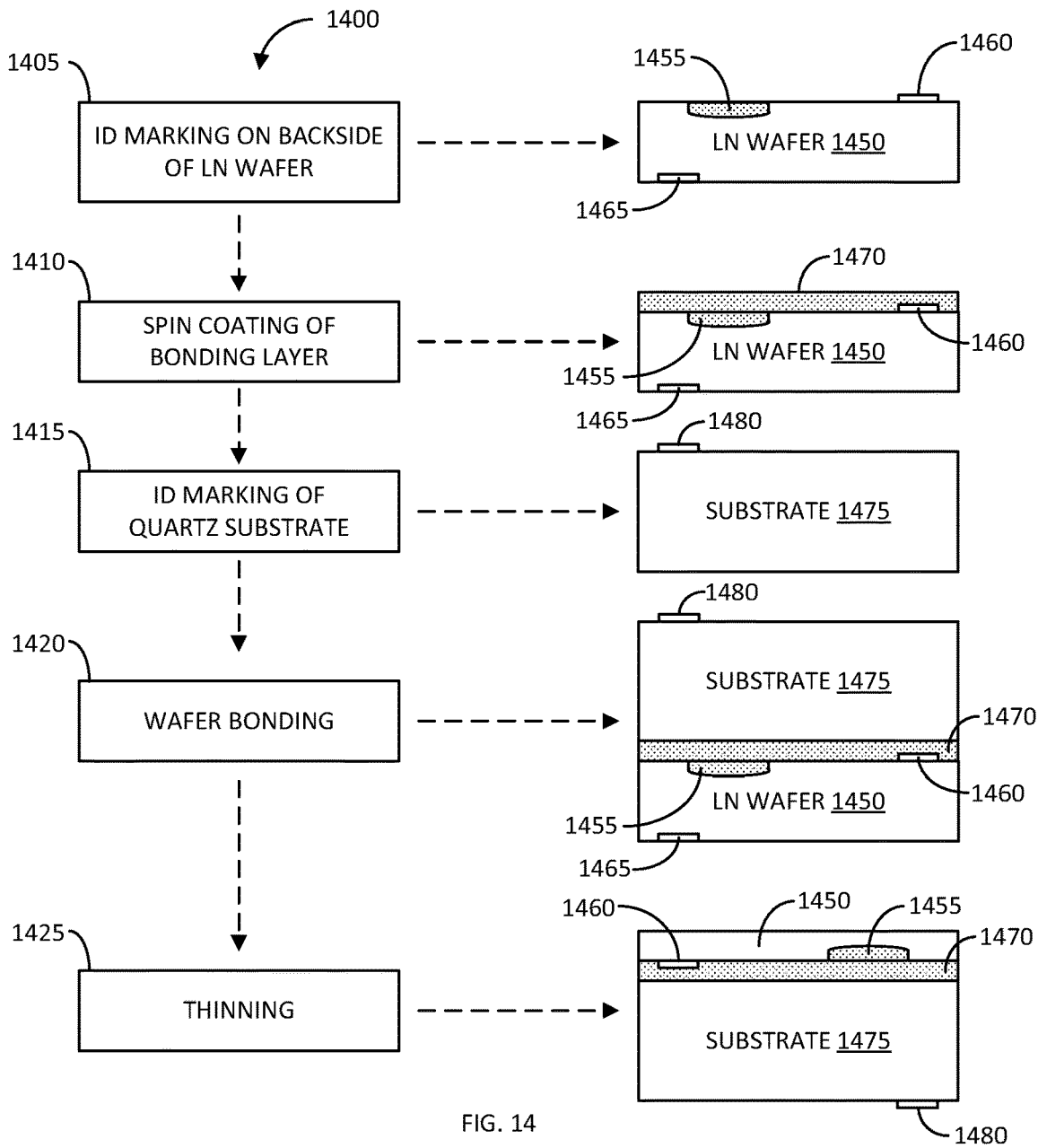
FIG. 14 illustrates a cross-sectional view of an example electro-optical modulator at various stages of another example method of making and identification marking the same in accordance with another aspect of the disclosure.

FIG. 14 illustrates a cross-sectional view of an example electro-optical modulator at various stages of another method 1400 of making and identification marking the same in accordance with another aspect of the disclosure. The method 1400 includes forming an optical waveguide 1455 within and an alignment marking 1460 over and/or on a top or first side of an LN wafer 1450, and a wafer identification marking 1465 over and/or on a bottom or second side of the LN wafer 1450 (block 1405). Further, the method 1400 includes forming (e.g., spin coating) a bonding layer 1470 on the top or first side of the LN wafer 1450 including over the optical waveguide 1455 and the alignment mark 1460 (block 1410). As previously mentioned, the bonding layer 1470 may be formed out of a polymer or dielectric (e.g., a polymer-based material, such as UV epoxy or glue, BCB polymer, SU-8 polymer, dry film photoresist, bonding sheet, or other polymers, or a dielectric-based material, such as Si nano-adhesive bond using $SiO_2/SiN_xO_y$ middle layer, or fusion bond using $SiO_2/SiN_xO_y$ middle layer, or others).

Additionally, the method 1400 includes forming a substrate identification marking 1480 over and/or on a bottom or second side of a substrate 1475 (e.g., single crystal quartz, fused silica, or silicon (Si) substrate) (block 1415). Then, according to the method 1400, the substrate 1475 is bonded to the LN wafer 1450 such that respective top or first sides of the substrate 1475 and the LN wafer 1450 attach to the bonding layer 1470 (block 1420). Finally, the method 1400 includes thinning (e.g., by polishing or CMP) the LN wafer 1450 to achieve a desired thickness (e.g., 7 µm) (block 1425). The identification markings 1465 and 1480 are useful for pairing and tracking the LN wafer 1450 and the substrate 1475.

Figure 15:
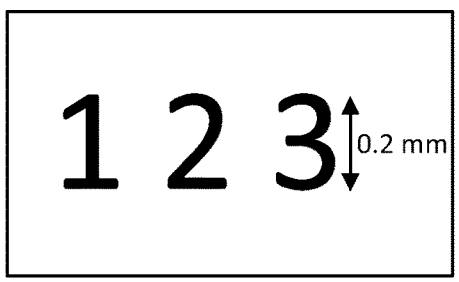
FIG. 15 illustrates a plan view of an example identification marking in accordance with another aspect of the disclosure.

FIG. 15 illustrates a plan view of an example identification marking 1500 in accordance with another aspect of the disclosure. The identification marking 1500 (e.g., the numbers "1 2 3" with a height of, for example, 0.2 millimeter (mm)) may be formed by nanosecond UV laser marking with a marking depth of, for example, greater than 10 µm.

Figure 16:
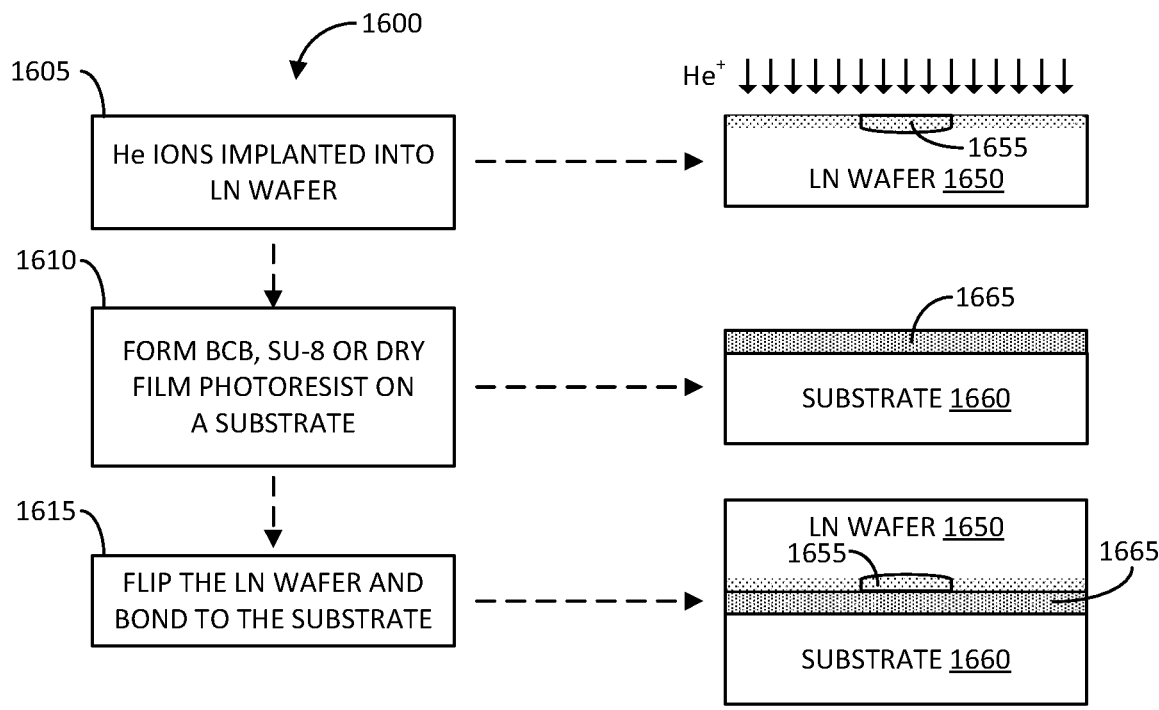
FIG. 16 illustrates a cross-sectional view of an example electro-optical modulator at various stages of an example method of bonding (e.g., using BCB, SU-8, and Dry film photoresist) a lithium-niobate (LN) wafer to a substrate in accordance with another aspect of the disclosure.

FIG. 16 illustrates a cross-sectional view of an example electro-optical modulator at various stages of an example method 1600 of bonding a lithium-niobate (LN) wafer 1650 to a substrate 1660 in accordance with another aspect of the disclosure. The method 1600 may be particularly useful when the bonding material is BCB, SU-8, or dry film photoresist.

In particular, according to the method 1600, the LN wafer 1650 including an optical waveguide 1655 (e.g., situated proximate its top or first side) are subjected to Helium ion ($He^+$) implantation to activate the top or first side surface (e.g., increase its surface energy) of the LN wafer 1650 (block 1605). Then, according to the method 1600, a bonding layer 1665 (e.g., BCB, SU-8, dry film photoresist, or other suitable bonding material) is formed on a top or first side of the substrate 1660 (e.g., a $SiO_2$ (e.g., single crystal quartz), fused silica, or silicon (Si) substrate) (block 1610). Further, according to the method 1600, the top or first side of the LN wafer 1650 is attached to the top or first side of the substrate 1660 via the bonding layer 1665 (block 1615).

Figure 17:
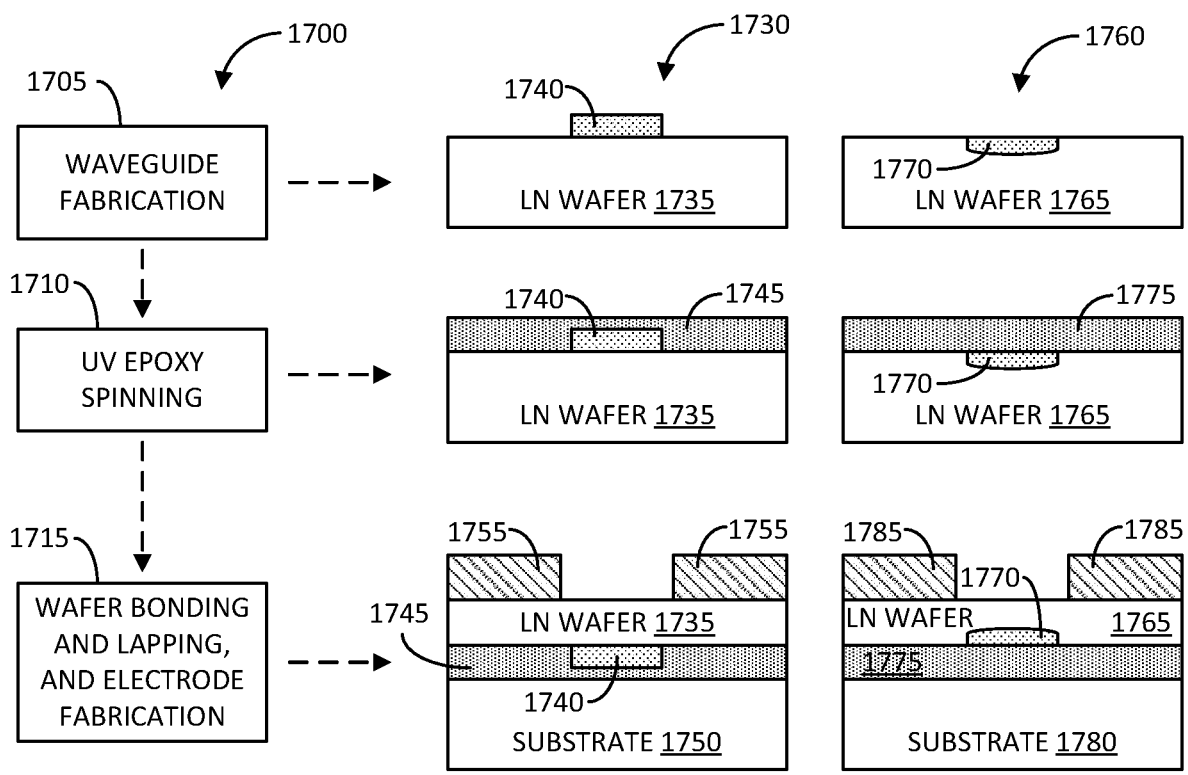
FIG. 17 illustrates a cross-sectional view of an example electro-optical modulator at various stages of another example method of bonding (e.g., using UV epoxy) a lithium-niobate (LN) wafer to a substrate in accordance with another aspect of the disclosure.

FIG. 17 illustrates a cross-sectional view of an example electro-optical modulator at various stages of another example method 1700 of bonding a lithium-niobate (LN) wafer 1735 or 1765 to a substrate 1750 or 1780 in accordance with another aspect of the disclosure. The method 1700 may be particularly useful when the bonding material is a UV epoxy. This method 1700 enables the creation of devices utilizing two types of waveguides, namely ridge and buried waveguides. The method 1700 involves the application of a thin layer of UV epoxy onto the surface of the LN waveguide, which is subsequently bonded to the $Si/SiO_2$ handle wafer.

In particular, according to the method 1700, a ridge or buried optical waveguide 1740 or 1770 is formed on or within an LN wafer 1735 or 1765, respectively (block 1705). A first ridge or grating pattern may be formed on the top or first side of the LN wafer 1735 or 1765 except proximate/over the optical waveguide 1740 or 1770. Then, according to the method 1700, a bonding layer 1745 or 1775 (e.g., UV epoxy spinning) is formed on a top or first side of the LN wafer 1735 or 1765 (e.g., single crystal quartz, fused silica, or silicon (Si) substrate), respectively (block 1710). A second ridge or grating pattern may be formed on the top or first side of the bonding layer 1745 or 1775 except proximate the optical waveguide 1740 or 1770. Further, according to the method 1700, the top or first side of the LN wafer 1735 or 1765 is attached to the top or first side of a substrate 1750 or 1780 via the bonding layer 1745 or 1775, the LN wafer 1735 or 1765 is thinned (e.g., by lapping), and coplanar stripline electrodes 1755 or 1785 are formed on a bottom or second side of the LN wafer 1735 or 1765, respectively (block 1715). The first and second ridge patterns may mate together to improve the bonding strength.

Figure 18:
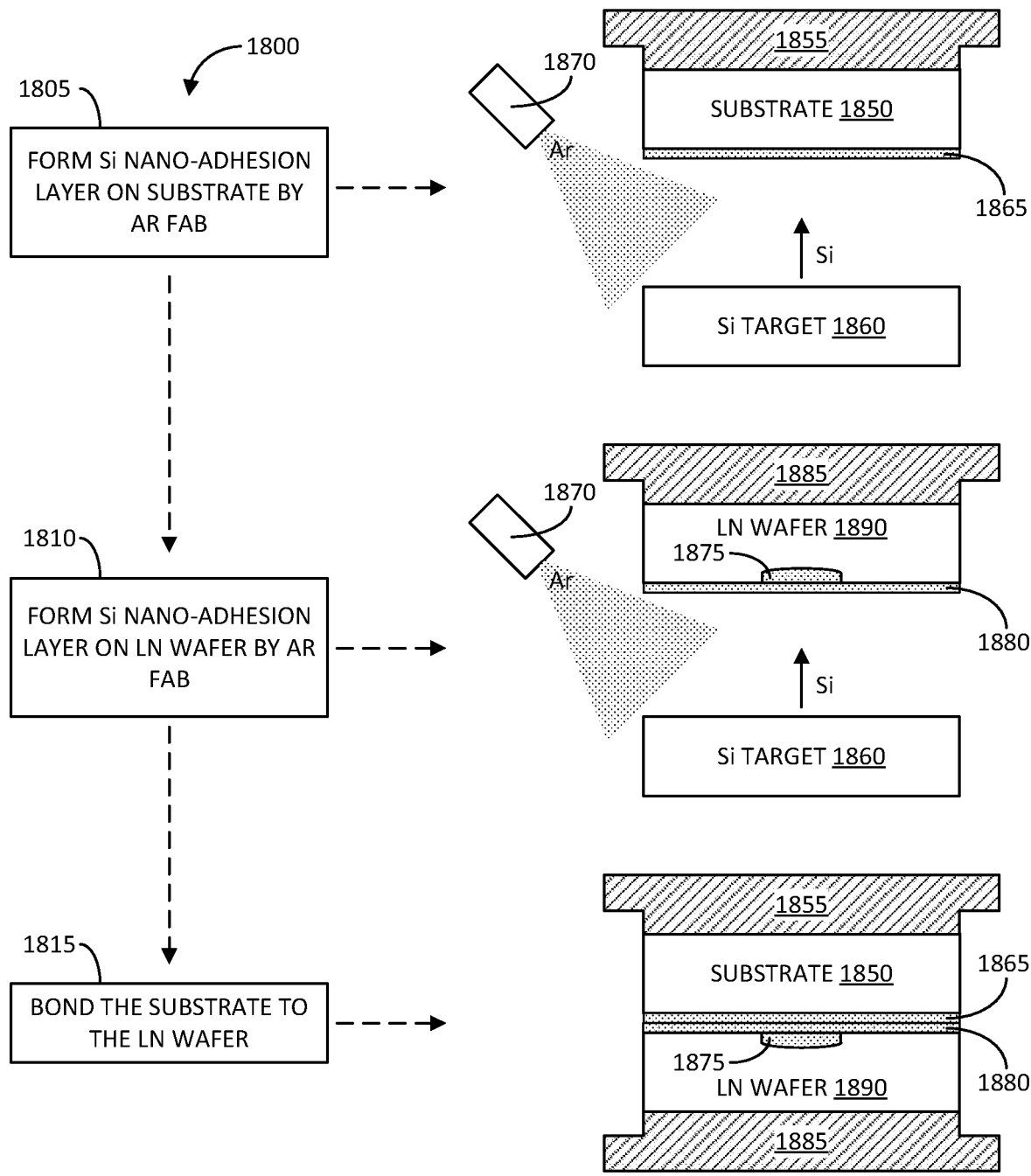
FIG. 18 illustrates a cross-sectional view of an example electro-optical modulator at various stages of another example method of bonding (e.g., using silicon nano adhesive bonding) a lithium-niobate (LN) wafer to a substrate in accordance with another aspect of the disclosure.

FIG. 18 illustrates a cross-sectional view of an example electro-optical modulator at various stages of another example method 1800 of bonding a lithium-niobate (LN) wafer 1865 to a substrate 1850 in accordance with another aspect of the disclosure. The method 1800 may be particularly useful when the bonding layer is a dielectric material $SiO_2$ or $SiN_xO_y$.

In particular, according to the method 1800, a Si nano-adhesive bonding layer 1865 is formed or deposited over and/or on a top or first side of the substrate 1850 (e.g., single crystal quartz, fused silica, or silicon (Si) substrate) by argon (AR) fast atom bombardment (FAB) 1870 to a silicon target 1860 (block 1805). A bottom or second side of the substrate 1850 may be attached to a first bonding mount or clamp 1855. Then, according to the method 1800, another Si nano-adhesive bonding layer 1880 is formed or deposited over and/or on a top or first side of the LN wafer 1890 including an optical waveguide 1875 (e.g., situated proximate the top or first side) by Ar FAB 1870 (block 1810). A bottom or second side of the LN wafer 1890 may be attached to a second bonding mount or clamp 1885. Further, according to the method 1800, the top or first side of the LN wafer 1890 is attached to the top or first side of the substrate 1850 via the bonding layers 1865 and 1880 (block 1815). The first and second bonding mounts or clamps 1855 and 1875 apply pressure to the substrate 1850 and LN wafer 1870 to improve the strength of the bonding of the LN wafer 1870 to the substrate 1850.

Figure 19:
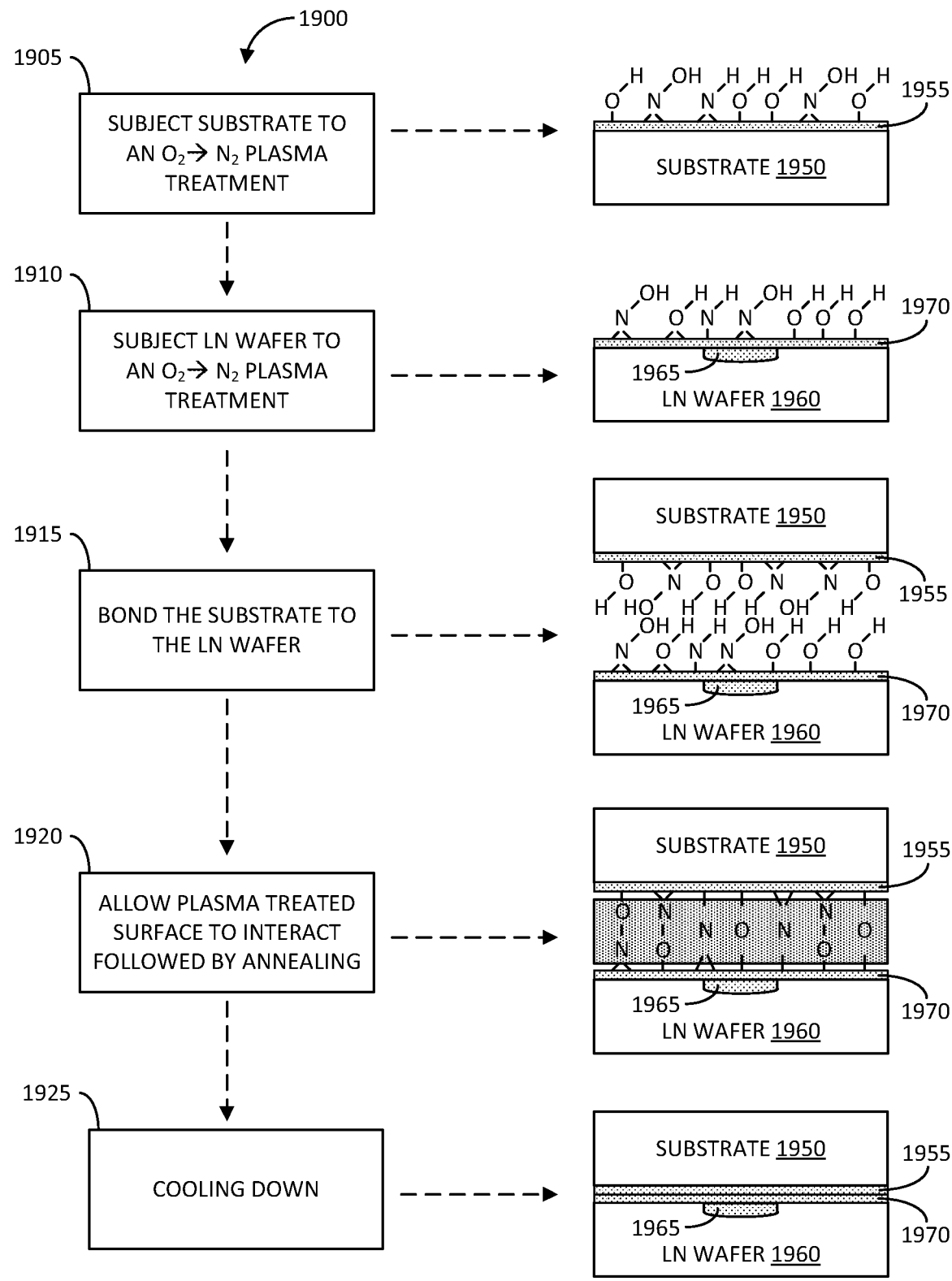
FIG. 19 illustrates a cross-sectional view of an example electro-optical modulator at various stages of another example method of bonding (e.g., using surface activation fusion bonding) a lithium-niobate (LN) wafer to a substrate in accordance with another aspect of the disclosure.

FIG. 19 illustrates a cross-sectional view of an example electro-optical modulator at various stages of another example method 1900 of bonding a lithium-niobate (LN) wafer to a substrate 1950 in accordance with another aspect of the disclosure. The method 1900 may be particularly useful when the bonding material is a fusion bond, $SiO_2/SiN_xO_y$. In particular, according to the method 1900, the substrate 1950 (e.g., a $SiO_2$ (e.g., single crystal quartz), fused silica, or silicon (Si) substrate) including a fusion bonding layer, $SiO_2/SiN_xO_y$ 1955 disposed on a top or first side thereof are subjected to an oxygen-nitrogen ($O_2 \rightarrow N_2$) plasma treatment (block 1905). The plasma treatment forms oxygen-hydrogen (O—H), nitrogen-oxygen-hydrogen (N—OH), and nitrogen-hydrogen (N—H) compounds on a top or first side of the bonding layer 1955. Then, according to the method 1900, the LN wafer 1960 including an optical waveguide 1965 and a fusion bonding layer, $SiO_2/SiN_xO_y$ 1970 disposed on a top or first side thereof are subjected to an oxygen-nitrogen ($O_2 \rightarrow N_2$) plasma treatment (block 1910). The plasma treatment forms oxygen-hydrogen (O—H), nitrogen-oxygen-hydrogen (N—OH), and nitrogen-hydrogen (N—H) on a top or first side of the bonding layer 1970.

Further, according to the method 1900, the substrate 1950 is bonded to the LN wafer 1960 such that the plasma-treated bonding layer 1955 of the substrate 1950 mates and interacts with the plasma-treated bonding layer 1970 of the LN wafer 1960 (block 1915). Through annealing, the mating and interaction of the respective O—H, N—OH, and N—H compounds form water molecules that activate the respective fusion bonding layers, $SiO_2/SiN_xO_y$ 1955 and 1970 to strengthen the bonding of the LN wafer 1960 to the substrate 1950 (block 1920). As noted, the activated fusion bonding layers, $SiO_2/SiN_xO_y$ 1955 and 1970 include N—O, N, and O molecular bonds. Then, according to the method 1900, the attached substrate 1950 and LN wafer 1960 are allowed to cool down to complete the curing of the fusion bond 1955/1970 between the substrate 1950 and LN wafer 1960 (block 1925).

Figure 20:
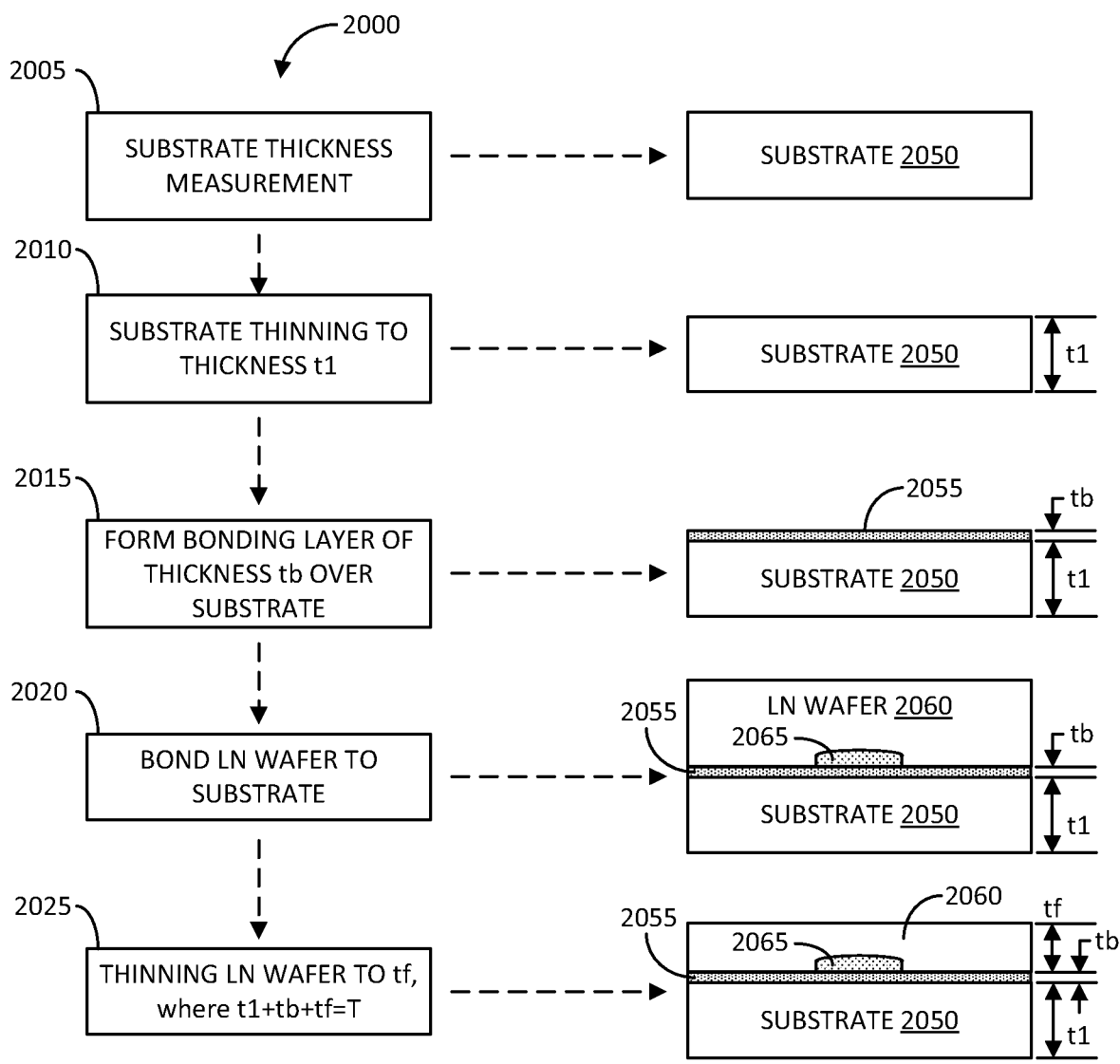
FIG. 20 illustrates a cross-sectional view of an example electro-optical modulator at various stages of an example method of thinning a lithium-niobate (LN) wafer and a substrate using thin-film thickness determination by subtraction in adhesive bonding in accordance with another aspect of the disclosure.

FIG. 20 illustrates a cross-sectional view of an example electro-optical modulator at various stages of an example method 2000 of thinning a lithium-niobate (LN) wafer 2060 and a substrate 2050 in accordance with another aspect of the disclosure. According to the method 2000, a measurement of a thickness of the substrate 2050 (e.g., a $SiO_2$ (e.g., single crystal quartz), fused silica, or silicon (Si) substrate) may be taken (block 2005). The thickness of the substrate 2050 may be measured using various techniques/equipment, such as Fourier transform infrared (FTIR), confocal chromatic sensor, or white light interferometer. Further, according to the method 2000, the substrate 2050 may be thinned to a defined thickness of t1 (block 2010). The aforementioned thickness measuring techniques/equipment may be used to control and verify the thickness t1 of the substrate 2050.

Additionally, the method 2000 includes forming a bonding layer 2055 of a defined thickness tb over and/or on a top or first side of the substrate 2050 (block 2015). The bonding layer 2055 is formed by different types of polymer-based materials, such as ultraviolet (UV) epoxy or glue, benzocyclobutene (BCB) polymer, SU-8 polymer, dry film photoresist, bonding sheet, and other types of polymers. The thickness of the bonding layer 2055 is mainly controlled by spinning process. No further surface treatment or thickness reduction is needed for bonding layer 2055. Similarly, the thickness tb of the bonding layer 2055 may be measured via the aforementioned thickness measuring techniques/equipment. Then, according to the method 2000, an LN wafer 2060 including an optical waveguide 2065 proximate its top or first side is attached to the top or first side of the substrate 2050 via the bonding layer 2055 (block 2020). Further, according to the method 2000, the LN wafer 2060 is thinned to a defined thickness of tf or to a defined total thickness of "T" for the attached LN wafer 2060, bonding layer 2055, and substrate 2050 (e.g., T=t1+tb+tf). In a like manner, the thickness tf and/or T may be measured via the aforementioned thickness measuring techniques/equipment.

Figure 21:
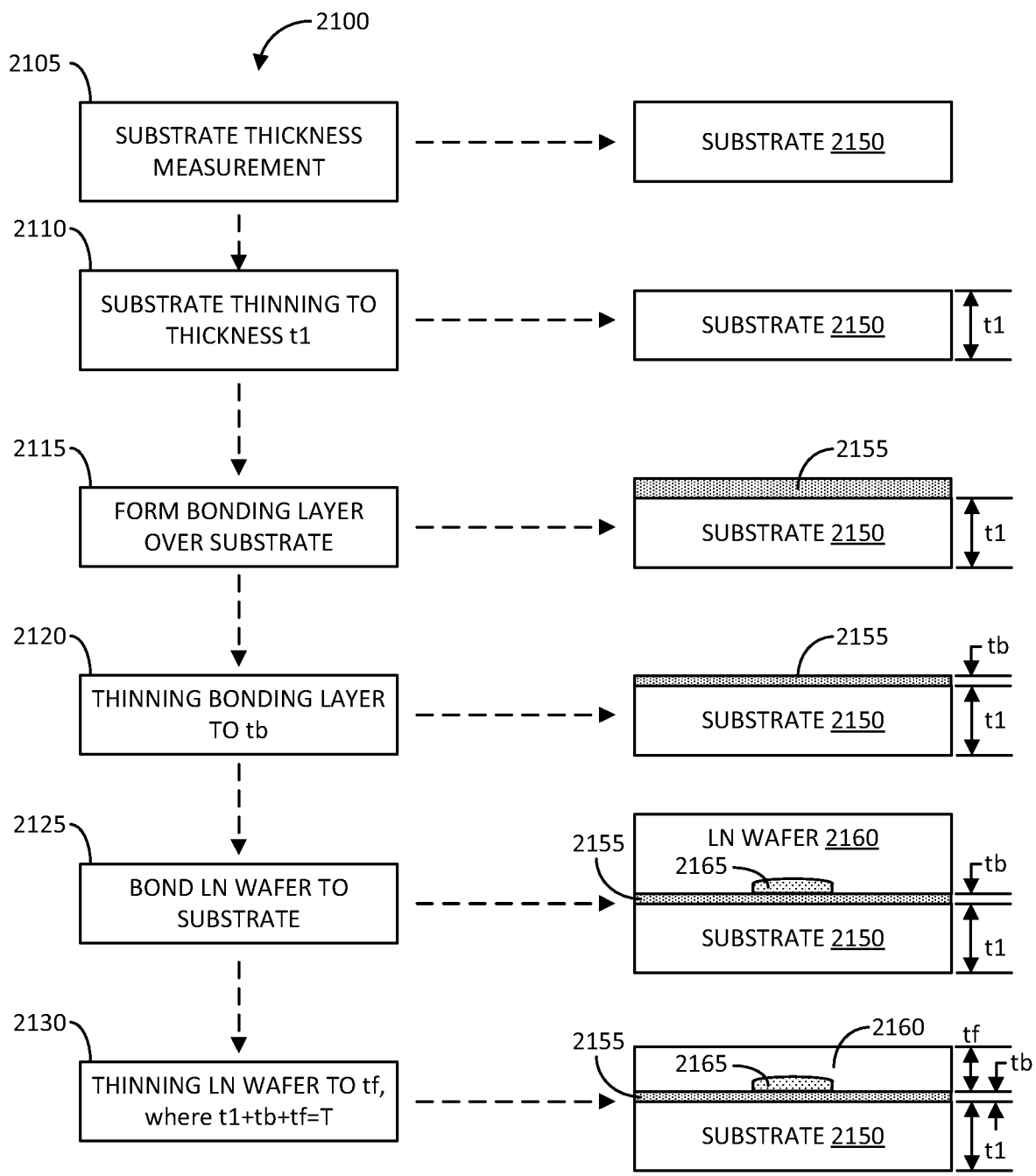
FIG. 21 illustrates a cross-sectional view of an example electro-optical modulator at various stages of an example method of thinning a lithium-niobate (LN) wafer, bonding layer, and a substrate using thin-film thickness determination by subtraction in dielectric middle layer bonding in accordance with another aspect of the disclosure.

FIG. 21 illustrates a cross-sectional view of an example electro-optical modulator at various stages of an example method 2100 of thinning a lithium-niobate (LN) wafer 2160, a bonding layer 2155, and a substrate 2150 in accordance with another aspect of the disclosure. According to the method 2100, a measurement of a thickness of the substrate 2150 (e.g., a $SiO_2$ (e.g., single crystal quartz), fused silica, or silicon (Si) substrate) may be taken (block 2105). The thickness of the substrate 2150 may be measured using various techniques/equipment, such as FTIR, confocal chromatic sensor, or white light interferometer. Further, according to the method 2100, the substrate 2150 may be thinned to a defined thickness of t1 (block 2110). The aforementioned thickness measuring techniques/equipment may be used to control and verify the thickness t1 of the substrate 2050.

Additionally, the method 2100 includes forming a bonding layer 2055 over and/or on a top or first side of the substrate 2150 (block 2115). The bonding layer 2155 is formed by a dielectric-based material, such as $SiO_2$ or $SiN_xO_y$ layer via PECVD. Such layer requires further surface treatment, e.g., nano silicon deposition and/or CMP to refine surface roughness. Then, according to the method 2100, the bonding layer 2155 is thinned to a defined thickness of tb (block 2120). Similarly, the thickness tb of the bonding layer 2155 may be measured via the aforementioned thickness measuring techniques/equipment. Then, according to the method 2100, an LN wafer 2160 including an optical waveguide 2165 proximate its top or first side is attached to the top or first side of the substrate 2150 via the bonding layer 2155 (block 2125). Further, according to the method 2100, the LN wafer 2160 is thinned to a defined thickness of tf or to a defined total thickness of "T" for the attached LN wafer 2160, bonding layer 2155, and substrate 2150 (e.g., T=t1+tb+tf). In a like manner, the thickness tf and/or T may be measured via the aforementioned thickness measuring techniques/equipment.

Figure 22:
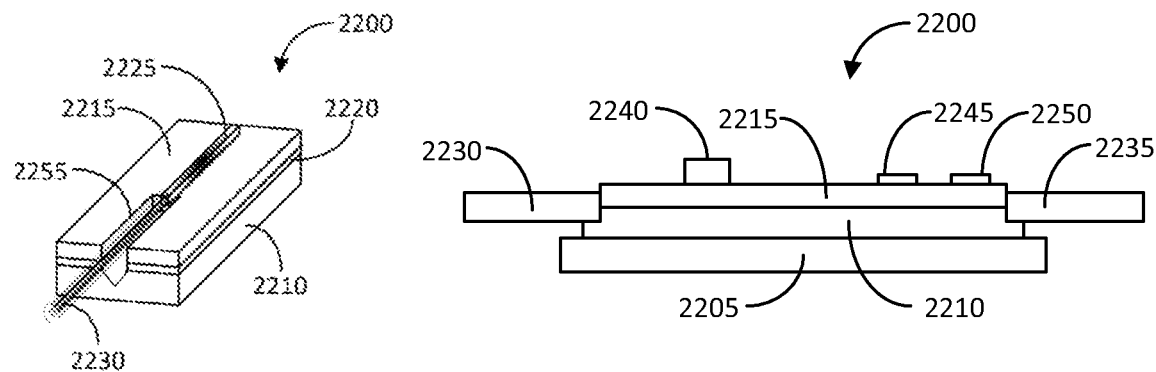
FIG. 22 illustrates perspective and side view of an example electro-optical modulator including an edge coupling method in accordance with another aspect of the disclosure.

FIG. 22 illustrates perspective and side views of an example electro-optical modulator 2200 in accordance with another aspect of the disclosure. The electro-optical modulator 2200 may be an example physical implementation of the electro-optical modulator 200 previously discussed. In particular, the electro-optical modulator 2200 includes a printed circuit board (PCB) 2205, a substrate 2210 (e.g., a $SiO_2$ (e.g., single crystal quartz), fused silica, or silicon (Si) substrate) mounted on top of the PCB 2205, and a thin-film lithium niobate (TFLN) layer 2215 attached to the substrate 2210 via a bonding layer 2220 (e.g., a polymer-based or dielectric-based bonding layer, as previously discussed). The TFLN 2215 includes a V groove 2255 longitudinally aligned with an optical waveguide 2225.

The electro-optical modulator 2200 further includes an input optical fiber 2230 situated centrally and longitudinally within the V groove 2255, and optically aligned with and coupled to the optical waveguide 2225. The electro-optical modulator 2200 also includes an output optical fiber 2235 optically aligned and coupled to the optical waveguide 2225.

The electro-optical modulator 2200 may include a flip-chip laser diode 2240, a photodetector 2245, and other electrical components 2250 (e.g., coplanar transmission lines 232 and 234a-b, DC bias conductors 236 and 238a-b, termination resistor $R_T$, and/or others) situated over and/or on the TFLN 2215.

Figure 23:
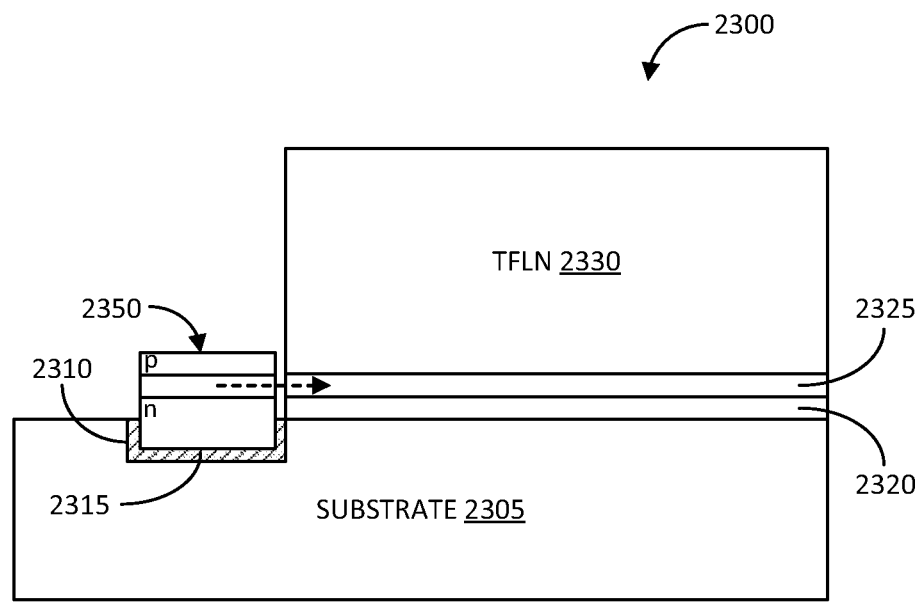
FIG. 23 illustrates a side view of an example electro-optical modulator including a die-to-LN chip integration method in accordance with another aspect of the disclosure.

FIG. 23 illustrates a side view of an example electro-optical modulator 2300 in accordance with another aspect of the disclosure. The electro-optical modulator 2300 may be an example physical implementation of the electro-optical modulator 200 previously discussed. In particular, the electro-optical modulator 2300 includes a substrate 2305 (e.g., a $SiO_2$ (e.g., single crystal quartz), fused silica, or silicon (Si) substrate) and a thin-film lithium niobate (TFLN) layer 2330 attached to the substrate 2305 via a bonding layer 2320 (e.g., a polymer-based or dielectric-based bonding layer, as previously discussed). The TFLN 2330 includes an optical waveguide 2325.

The electro-optical modulator 2300 further includes a laser source 2350 (e.g., a DFB) 2350 attached to the substrate 2305 via, for example, preformed solder 2315. The laser source 2350 may be situated within a channel or groove 2310 formed within the substrate 2305 such that the optical aperture of the laser source 2350 is substantially aligned with the optical waveguide 2325 of the TFLN 2330. Thus, as indicated by the dashed arrow, the laser source 2350 is configured to generate a CW optical carrier for optically coupling from the laser source 2350 to the optical waveguide 2325 of the TFLN 2330.

Figure 24:
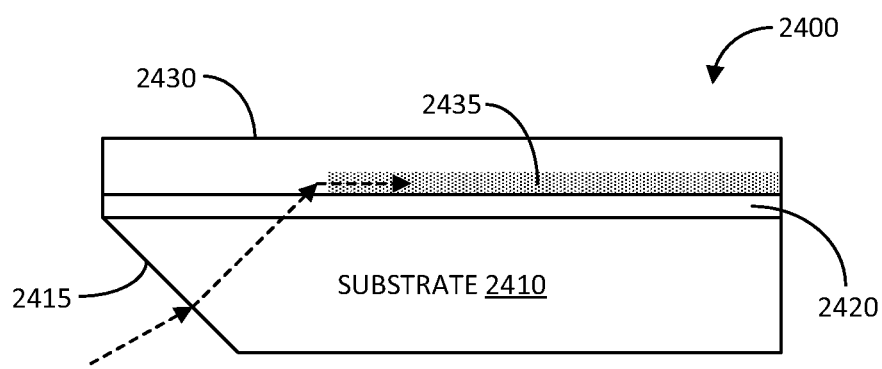
FIG. 24 illustrates a side view of an example electro-optical modulator including a prism coupling method in accordance with another aspect of the disclosure.

FIG. 24 illustrates a side view of an example electro-optical modulator 2400 in accordance with another aspect of the disclosure. The electro-optical modulator 2400 may be an example physical implementation of the electro-optical modulator 200 previously discussed. In particular, the electro-optical modulator 2400 includes a substrate 2410 (e.g., a $SiO_2$ (e.g., single crystal quartz), fused silica, or silicon (Si) substrate) and a thin-film lithium niobate (TFLN) layer 2430 including an optical waveguide 2435 attached to the substrate 2410 via a bonding layer 2420 (e.g., a polymer-based or dielectric-based bonding layer, as previously discussed). The substrate 2410 may include a surface 2415 that functions as a prism to bend and direct an input optical signal (e.g., a CW optical carrier generated by a laser source) towards an input of the optical waveguide 2435, as indicated by the dashed-arrow line representative of the input optical signal.

Figure 25:
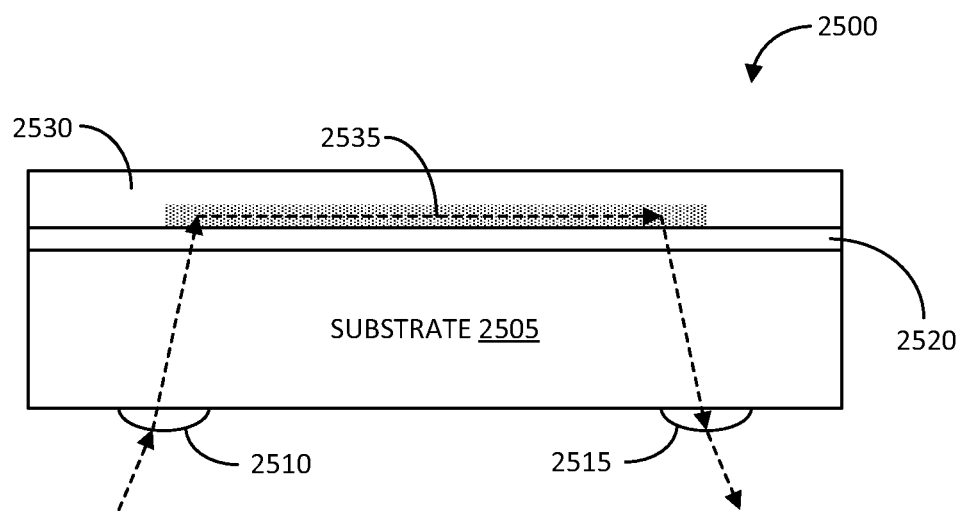
FIG. 25 illustrates a side view of an example electro-optical modulator including micro lens and grating coupling method in accordance with another aspect of the disclosure.

FIG. 25 illustrates a side view of an example electro-optical modulator 2500 in accordance with another aspect of the disclosure. The electro-optical modulator 2500 may be an example physical implementation of the electro-optical modulator 200 previously discussed. In particular, the electro-optical modulator 2500 includes a silicon substrate 2505 and a thin-film lithium niobate (TFLN) layer 2530 including an optical waveguide 2535 attached to the substrate 2505 via a bonding layer 2520 (e.g., a polymer-based or dielectric-based bonding layer, as previously discussed). The substrate 2505 includes input and output lenses 2510 and 2515 formed at a surface (e.g., bottom) of the substrate 2505 configured to bend and direct an input optical signal (e.g., a CW optical carrier generated by a laser source) towards a grating coupler input of the optical waveguide 2535 and an output modulated optical signal towards an output fiber (not shown), as indicated by the dashed-arrow lines representative of the input and output optical signals, respectively.

Figure 26A:
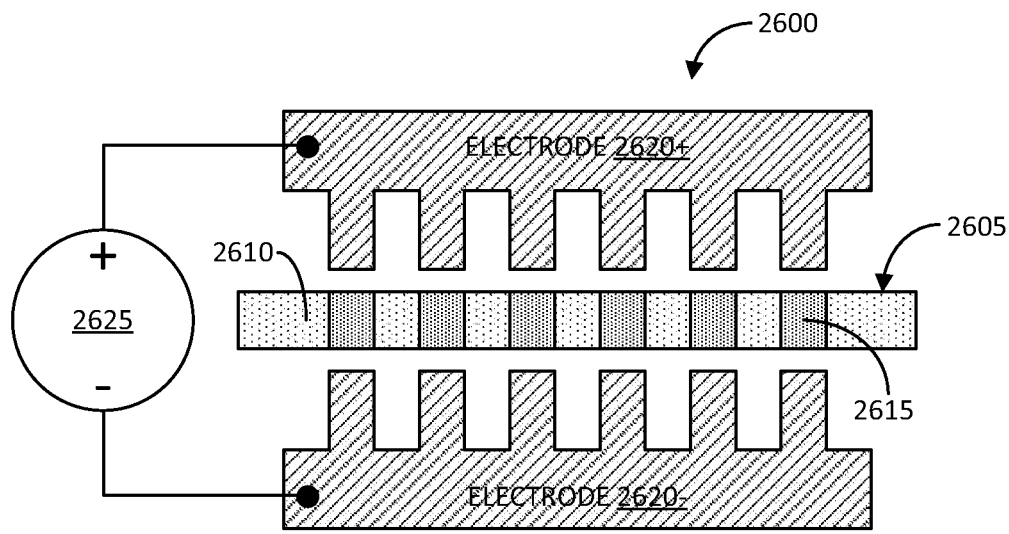
FIG. 26A-26B illustrate diagrams associated with an example method of forming a periodically poled lithium niobate (PPLN) in accordance with another aspect of the disclosure.

FIG. 26A illustrates a diagram of an example apparatus 2600 for forming a periodically poled lithium niobate (PPLN) 2605 in accordance with another aspect of the disclosure. The PPLN 2605 may be used to perform different types of non-linear optical operations, such as frequency doubling, difference frequency generation, sum frequency generation, optical parametric oscillation, and other nonlinear processes. The PPLN 2605 includes a thin-film lithium niobate (TFLN) with alternating and periodic regions of different index of refractions 2610 and 2615.

The PPLN 2605 is formed by forming positive and negative electrodes 2620+ and 2620− laterally on either side of the TFLN, where each electrode includes a set of periodic protrusions laterally aligned with the regions 2615 of higher index of refractions compared to regions 2610. The positive and negative electrodes 2620+ and 2620− are coupled to a voltage source 2625 to form a potential or voltage difference between the electrodes 2620+ and 2620−. The potential or voltage difference forms an electric field across the TFLN 2605 that increases the index of refraction of the TFLN at the periodic regions 2615 laterally aligned with the set of protrusions of the positive and negative electrodes 2620+ and 2620−.

Figure 26B:
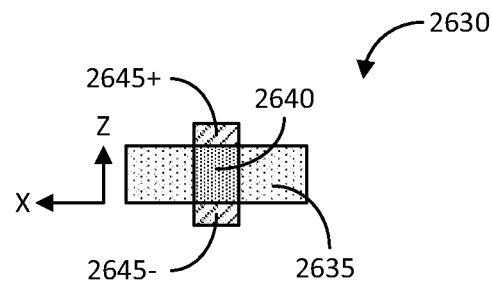

FIG. 26B illustrates a side view of a portion of an example periodically poled lithium niobate (PPLN) 2630 including a thin-film lithium niobate (TFLN) 2635 with a region 2640 of higher index of refraction in accordance with another aspect of the disclosure. The TFLN 2635 includes a crystal structure where positive and negative electrodes 2645+ and 2645− for forming the higher index of refraction region 2640 are situated on either side of the TFLN 2635 along the Z-axis of its crystal structure. A drawback of such PPLN forming approach is that the thickness of the TFLN 2635 dictates the spacing between the electrodes 2645+ and 2645−. This may cause the potential or voltage difference across the electrodes 2645+ and 2645− to be significantly higher to produce the electric field needed to suitably increase the index of refraction at the region 2640 of the TFLN 2635.

Figure 27A:
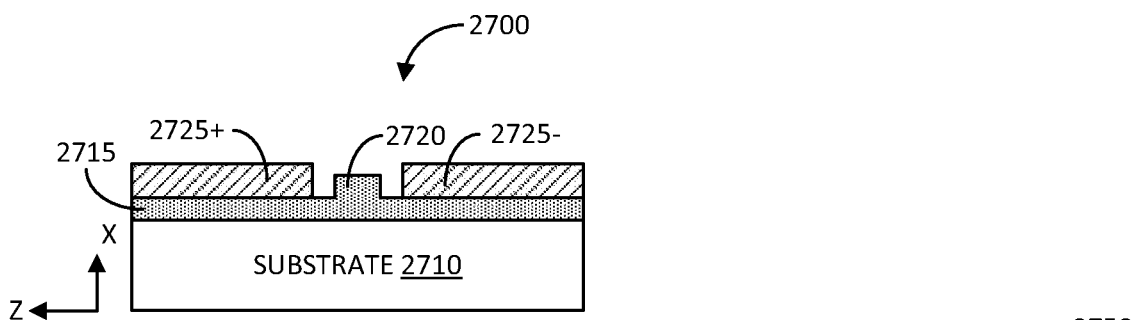
FIGS. 27A-27B illustrate side views of example periodically poled lithium niobate (PPLNs) in accordance with another aspect of the disclosure.

FIG. 27A illustrates a side view of an example periodically poled lithium niobate (PPLNs) 2700 in accordance with another aspect of the disclosure. The side view of the PPLN 2700 is along the longitudinal axis of the PPLN. The PPLN 2700 includes a substrate 2710 (e.g., a SiO₂ (e.g., single crystal quartz), fused silica, or silicon (Si) substrate), a thin-film lithium niobate (TFLN) layer 2715 formed over and/or on the substrate 2710. In this example, the TFLN layer 2715 includes a ridge optical waveguide 2720. The PPLN 2700 includes positive and negative electrodes 2725+ and 2725− formed over and/or on the TFLN 2715, and laterally on either side of the ridge optical waveguide 2720. As, in this example, the Z-axis of the crystal structure of the TFLN 2715 extends horizontally such that the electrodes 2725+ and 2725− are on either side of the optical waveguide 2720 along the Z-axis direction, the electrodes 2725+ and 2725− may be formed closer to the ridge optical waveguide 2720 compared to the electrodes 2645+ and 2645− of PPLN 2630. Thus, the potential or voltage difference across the electrodes 2725+ and 2725− to produce the suitably higher index of refraction region may be significantly smaller than that of PPLN 2630.

Figure 27B:
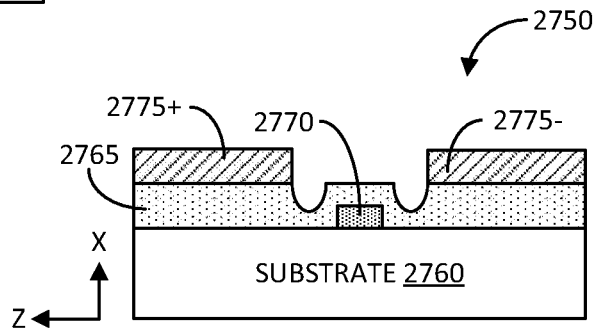

FIG. 27B illustrates a side view of another example periodically poled lithium niobate (PPLNs) 2750 in accordance with another aspect of the disclosure. The side view of the PPLN 2750 is along the longitudinal axis of the PPLN. The PPLN 2750 includes a substrate 2760 (e.g., a SiO₂ (e.g., single crystal quartz), fused silica, or silicon (Si) substrate), a thin-film lithium niobate (TFLN) layer 2765 formed over and/or on the substrate 2760. In this example, the TFLN layer 2715 includes a buried optical waveguide 2770. The PPLN 2750 includes positive and negative electrodes 2775+ and 2775− formed over and/or on the TFLN 2765, and laterally on either side of the buried optical waveguide 2770. As, in this example, the Z-axis of the crystal structure of the TFLN 2765 extends horizontally such that the electrodes 2775+ and 2775− are on either side of the optical waveguide 2770 along the Z-axis direction, the electrodes 2775+ and 2775− may be formed closer to the buried optical waveguide 2770 compared to the electrodes 2645+ and 2645− of PPLN 2630. Thus, the potential or voltage difference across the electrodes 2775+ and 2775− to produce the suitably higher index of refraction region may be significantly smaller than that of PPLN 2630.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A method, comprising:
   forming a lithium-niobate (LN) wafer including an optical waveguide situated within and proximate a first side of the LN wafer;
   forming a bonding layer over and/or on a first side of a substrate; and
   thinning the bonding layer to a first thickness,
   bonding the LN wafer to the substrate such that the first side of the LN wafer faces the first side of substrate;
   thinning the LN wafer; and
   forming coplanar transmission lines over and/or on a second side of the LN wafer,
   wherein the coplanar transmission lines extend parallel with and are laterally on either side of the optical waveguide;
   wherein bonding the LN wafer to the substrate comprises attaching the LN wafer to the substrate via the thinned bonding layer, and
   wherein thinning the LN wafer comprises thinning the LN wafer so that a defined total thickness is achieved for the attached LN wafer and the bonding layer.

2. The method of claim 1, wherein forming the LN wafer comprises diffusing titanium (Ti) into the LN wafer to form the optical waveguide.

3. The method of claim 1, wherein forming the LN wafer comprises performing an annealed proton exchange with the LN wafer to form the optical waveguide.

4. The method of claim 1, wherein bonding the LN wafer to the substrate further comprises forming a bonding layer over and/or on the first side of the LN wafer.

5. The method of claim 4, wherein the bonding layer comprises a polymer.

6. The method of claim 4, wherein the bonding layer comprises an ultraviolet (UV) glue, a benzocyclobutene (BCB) polymer, a SU-8 polymer, a dry film photoresist, or a bonding sheet.

7. The method of claim 4, wherein the bonding layer comprises a dielectric.

8. The method of claim 4, wherein the bonding layer comprises a silicon (Si) nano-adhesive bond or a surface activated fusion bond.

9. The method of claim 4, wherein bonding the LN wafer to the substrate comprises subjecting the first side of the LN wafer to Helium ion implantation then forming the bonding layer over and/or on either the first side of the LN wafer or over and/or on the first side of the substrate.

10. The method of claim 4, wherein bonding the LN wafer to the substrate comprises:
forming a first ridge pattern on the first side of the LN wafer;
forming a second ridge pattern on the bonding layer over and/or on the first side of the substrate; and
attaching the LN wafer to the substrate such that the first ridge pattern is mated to the second ridge pattern.

11. The method of claim 4, wherein the bonding layer comprises first and second bonding layers, and wherein bonding the LN wafer to the substrate comprises:
forming the first bonding layer over and/or on the first side of the substrate including a first argon (Ar) fast atom bombardment (FAB) of a silicon target;
forming the second bonding layer over and/or on the first side of the LN wafer including a second Ar FAB of the silicon target; and
attaching the LN wafer to the substrate such via the Ar irradiated first and second bonding layers.

12. The method of claim 4, wherein the bonding layer comprises first and second bonding layers, and wherein bonding the LN wafer to the substrate comprises:
forming the first bonding layer over and/or on the first side of the substrate;
subjecting the first bonding layer to a first plasma treatment;
forming the second bonding layer over and/or on the first side of the LN wafer;
subjecting the second bonding layer to a second plasma treatment; and
attaching the LN wafer to the substrate via the plasma-treated first and second bonding layers.

13. The method of claim 12, wherein at least one of the first and second plasma treatments comprises an oxygen-nitrogen plasma treatment.

14. The method of claim 12, wherein bonding the LN wafer to the substrate further comprises annealing the plasma-treated first and second bonding layers.

15. The method of claim 1, wherein the substrate comprises silicon-oxide ($SiO_2$), silicon, fused silica, or single crystal quartz.

16. The method of claim 1, wherein the coplanar transmission lines comprise gold.

17. The method of claim 1, wherein thinning the LN wafer comprises polishing the second side of the LN wafer.

18. The method of claim 1, wherein thinning the LN wafer comprises chemical mechanical polishing (CMP) the second side of the LN wafer.

19. The method of claim 1, further comprising: thinning the substrate to a first-second thickness.

20. The method of claim 1, further comprising forming an alignment marking on the first side of the LN wafer.

21. The method of claim 20, wherein the alignment marking comprises chromium (Cr) or chromium-silicon (Cr—Si).

22. The method of claim 1, further comprising forming a wafer identification marking on the second side of the LN wafer.

23. The method of claim 22, further comprising forming a substrate identification marking on a first side of the substrate opposite a second side upon which the LN wafer attaches to the substrate.

24. The method of claim 1, further comprising forming a periodically poled lithium niobate (PPLN) along the optical waveguide of the LN wafer.

25. The method of claim 24, wherein forming the PPLN comprises applying an electric field across the optical waveguide in a directional substantially parallel to a Z-axis of a crystal structure of the LN wafer.

* * * * *